United States Patent [19]
Takeuchi et al.

[11] Patent Number: 5,430,591
[45] Date of Patent: Jul. 4, 1995

[54] NEGATIVE PRESSURE FLYING HEAD SLIDER HAVING SIDERAILS WITH NARROW WIDTH PORTION

[75] Inventors: Yoshinori Takeuchi, Ishioka; Kenji Mori, Hadano; Masaaki Matsumoto, Odawara; Hiroshi Agari, Hiratsuka; Jyousei Shimizu, Odawara; Eisei Togawa, Odawara; Yasuo Kojima, Odawara; Mikio Tokuyama, Tsukuba; Hiromitsu Tokisue, Ibaraki; Hidekazu Kohira, Odawara; Yokuo Saitoh, Kanagawa; Haruhide Takahashi, Odawara; Yoshihiro Shiorishi, Hachioji, all of Japan

[73] Assignee: Hitachi, Ltd., Tokyo, Japan

[21] Appl. No.: 135,442

[22] Filed: Oct. 13, 1993

[30] Foreign Application Priority Data

Oct. 13, 1992 [JP] Japan .................. 4-273987
Jan. 19, 1993 [JP] Japan .................. 5-006420
May 19, 1993 [JP] Japan .................. 5-116964

[51] Int. Cl.6 ............................................. G11B 5/60
[52] U.S. Cl. ................................................. 360/103
[58] Field of Search ................................... 360/103

[56] References Cited

U.S. PATENT DOCUMENTS 5,212,608  5/1993  Yoneoka ................ 360/103
5,218,494  6/1993  Chapin et al. .......... 360/103

Primary Examiner—A. J. Heinz
Attorney, Agent, or Firm—Antonelli, Terry, Stout & Kraus

[57] ABSTRACT

A flying head slider utilizing a negative pressure according to the invention has a front end, a rear end, and an air bearing surface directed to face a rotating recording medium. The air bearing surface includes a pair of side rails extending on both sides of the air bearing surface from the front end in the longitudinal direction of the slider, a center rail provided at the center of the air bearing surface in the transverse direction and extending from the front end to the rear end in the longitudinal direction of the slider, a cross rail extending in the transverse direction of the slider to connect the pair of side rails and the center rail to each other near the front end, a pair of recesses defined by the pair of side rails, the center rail and the cross rail, communicating grooves for communicating the pair of recesses with the front end, and a head mounted on a rear end surface of the center rail. The pair of side rails, the center rail and the cross rail lie substantially in the same plane. The pair of side rails are spaced from the rear end and are terminated at oblique edges in agreement with oblique lines extending from side edges of the slider to the center of the center rail at its rear end. The pair of side rails each has a width shape which is gradually narrowed from the front end toward a narrow portion located in a vicinity of a center of the slider, and is gradually spread from the narrow portion toward the rear end. The center rail is extended from the front end with substantially a constant width, followed by a width shape gradually spreading toward the rear end.

33 Claims, 22 Drawing Sheets $e \leq g/2$
$e < f$ $30° < \theta_e < 60°$

NEGATIVE PRESSURE FLYING HEAD SLIDER HAVING SIDERAILS WITH NARROW WIDTH PORTION

BACKGROUND OF THE INVENTION

The present invention relates to a flying head slider for stably flying a magnetic head off the surface of a magnetic disk.

In conventional magnetic disk apparatus, there has been widely used a flying head slider as disclosed in U.S. Pat. No. 3,823,416 in which at least two straight rail surfaces form air bearing surfaces. A flying head slider of the type having a pair of side rails spaced from a rear end of the slider and one center rail disposed between the side rails, with a magnetic head mounted at a rear end of the center rail, as disclosed in U.S. Pat. No. 4,894,740, has also been put into practice.

Meanwhile, a magnetic resistance effect type head and a recording method wherein recording density is almost the same from inner periphery to outer periphery of a magnetic disk (hereinafter referred to as a multi-zone recording method) are beginning to be used, aiming at higher recording density.

In a magnetic resistance effect type head, recording is made by using an induction type magnetic head device comprising a core and a coil as usual, but reproduction is made by utilizing the property of a magnetic resistance effect film that its electric resistance varies depending on the intensity of magnetic flux penetrating the film. Therefore, the magnetic resistance effect type head has not the property that reproduction output increases at higher relative speed between a magnetic head and a magnetic disk medium, as has been obtained in the conventional induction type magnetic head. It is thus not expected in the magnetic resistance effect type head to reproduce data more advantageously in outer periphery than inner periphery of the disk.

Also, because recording density is almost the same from inner periphery to outer periphery of a magnetic disk in the multi-zone recording method, the method is not compatible with such a conventional design concept that recording/reproducing can be made in the outer periphery even if the flying height is fairly larger in the inner periphery than in the outer periphery of the disk.

The foregoing situation in art has raised a necessity of keeping the flying height substantially constant from inner periphery to outer periphery of a magnetic disk, in order to maximally utilize capabilities of the magnetic resistance effect type head and the multi-zone recording method. The above-mentioned magnetic head sliders of prior art are disadvantageous in that, because positive pressure generating bearings are used, the flying height varies with changes in the circumferential speed of a disk, and that the flying height becomes largely different between the inner periphery and the outer periphery if those prior art sliders are used in magnetic disk apparatus of linear actuator type. Also, if those prior art sliders are used in magnetic disk apparatus of rotary actuator type, the flying height can be kept nearly constant from the inner periphery to the outer periphery by combining the property that the flying height decreases with a yaw angle produced and the property that the flying height increases at the higher circumferential speed. However, when an access operation is made at high speeds in magnetic disk apparatus, a slider is moved at high speeds in a transverse direction thereof and brought into the same condition as where a yaw angle is apparently produced. This raises another disadvantage in the above prior art sliders that the flying height is reduced during the access operation. Thus, rotary actuator type apparatus using the above prior art sliders can keep the flying height nearly constant from the inner periphery to the outer periphery, but a reduction in the flying height during the access operation cannot be overcome so long as the apparatus design employs the property that the flying height decreases with a yaw angle produced.

Sliders of the type that the flying height is kept constant from the inner periphery to the outer periphery by utilizing a negative pressure instead of utilizing the property that the flying height decreases with a yaw angle produced, are disclosed in U.S. Pat. No. 4,475,135 and U.S. Pat. No. 4,555,739. In these prior arts, the slider has a cross rail for generating a negative pressure which is balanced with a positive pressure generated by a positive pressure generating rail, enabling the flying height to be kept constant from the inner periphery to the outer periphery. However, this type slider has drawbacks that the flying height decreases largely with a yaw angle produced, and that dust and dirt are apt to gather and a high degree of reliability is hard to maintain, because the cross rail and tapered portions are provided all over the width of the slider at its front edge.

On the other hand, a reduction in the flying height with a yaw angle produced can be effectively suppressed by a method of arranging a rail obliquely with respect to the direction of air inflow, as embodied in a slider having a rail central portion narrower than rail front and rear portions as disclosed in Japanese Patent Unexamined Publication No. 60-101781, and a triangular slider as disclosed in Japanese Patent Unexamined Publication No. 61-230687 corresponding to U.S. Ser. No. 718,910, filed on Apr. 2, 1985. As a method of suppressing intrusion of dust and dirt by utilizing a negative pressure, it is effective to form a slider into a wedge-like shape as disclosed in U.S. Pat. No. 4,644,641. However, those prior art sliders have a limitation in improving flying stability in the rolling direction and hence accompany a problem in reducing not only the slider size but also the flying height. The flying stability in the rolling direction is improved by mounting a magnetic head at a rear end of a center rail and forming side rails to be spaced from a rear edge of the slider, as disclosed in Japanese Patent Unexamined Publication No. 1-298585 and U.S. Pat. No. 4,894,740. With the prior arts, as mentioned above, the techniques effective in overcoming the individual problems are disclosed, but any of the prior art sliders has difficulties in overcoming all the problems in a well balanced manner.

The present invention is to provide a magnetic head slider which can effectively overcome the above-mentioned problems in the prior art and to realize all the purposes of keeping the flying height almost constant from inner periphery to outer periphery of a magnetic disk, suppressing a reduction in the flying height with a yaw angle produced and hence a reduction in the flying height during access operation, suppressing intrusion and compression of dust, and reducing size of the entire slider while ensuring flying stability in up-and-down, pitching and rolling directions, and which can maximally utilize capabilities of the magnetic resistance effect type head and the multi-zone recording method.

SUMMARY OF THE INVENTION

One embodiment of a flying head slider utilizing a negative pressure according to the invention has a front end, a rear end, and an air bearing surface directed to face a rotating recording medium. The air bearing surface includes a pair of side rails extending on both sides of the air bearing surface from the front end in the longitudinal direction of the slider, a center rail provided at the center of the air bearing surface in the transverse direction and extending from the front end to the rear end in the longitudinal direction of the slider, a cross rail extending in the transverse direction of the slider to connect the pair of side rails and the center rail to each other near the front end, a pair of recesses defined by the pair of side rails, the center rail and the cross rail, communicating grooves for communicating the pair of recesses with the front end, and a head mounted on a rear end surface of the center rail. The pair of side rails, the center rail and the cross rail lie substantially in the same plane. The pair of side rails are spaced from the rear end and are terminated at oblique edges in agreement with oblique lines extending from side edges of the slider to the center of the center rail at its rear end, the pair of side rails each having a width shape which is gradually narrowed from the front end toward a narrow portion located in a vicinity of a center of the slider, and is gradually spread from the narrow portion toward the rear end. The center rail is extended from the front end with substantially a constant width, followed by a width shape gradually spreading toward the rear end.

Another embodiment of the flying head slider utilizing a negative pressure according to the invention has a front end, a rear end, and an air bearing surface directed to face a rotating recording medium. The air bearing surface includes, a pair of side rails extending on both sides of the air bearing surface from the front end in the longitudinal direction of the slider, a center rail provided at the center of the air bearing surface in the transverse direction and extending from the front end to the rear end in the longitudinal direction of the slider, a cross rail extending in the transverse direction of the slider to connect the pair of side rails and the center rail to each other near the front end, a pair of first recesses defined by the pair of side rails, the center rail and the cross rail, and a head mounted on a rear end surface of the center rail. The pair of side rails, the center rail and the cross rail lie substantially in the same plane. The pair of side rails are spaced from the rear end and are terminated at oblique edges in agreement with oblique lines extending from side edges of the slider to the center of the center rail at its rear end, the pair of side rails each having a width shape which is gradually narrowed from the front end toward a narrow portion located in a vicinity of a center of the slider, and is gradually spread from the narrow portion toward the rear end. The center rail is extended from the front end with substantially a constant width, followed by a width shape gradually spreading toward the rear end.

Still another embodiment of the flying head slider utilizing a negative pressure according to the invention has a front end, a rear end, and an air bearing surface directed to face a rotating recording medium. The air bearing surface includes a pair of side rails extending on both sides of the air bearing surface from the front end in the longitudinal direction of the slider, a center rail provided at the center of the air bearing surface in the transverse direction and extending from the front end to the rear end in the longitudinal direction of the slider, a cross rail extending in the transverse direction of the slider to connect the pair of side rails and the center rail to each other near the front end, a pair of first recesses defined by the pair of side rails, the center rail and the cross rail, triangular second recesses formed at both corners of the front end of the slider for forming side edges of the cross rail on the front end side into a wedge shape converging toward the front end, and a head mounted on a rear end surface of the center rail. The pair of side rails, the center rail and the cross rail lie substantially in the same plane. The pair of side rails are spaced from the rear end and are terminated at oblique edges in agreement with oblique lines extending from side edges of the slider to the center of the center rail at its rear end, the pair of side rails each having a width shape which is gradually narrowed from the front end toward a narrow portion located in a vicinity of a center of the slider, and is gradually spread from the narrow portion toward the rear end. The center rail is extended from the front end with substantially a constant width, followed by a width shape gradually spreading toward the rear end.

DESCRIPTION OF THE PREFERRED EMBODIMENTS

Hereinafter, embodiments of the present invention will be described with reference to the drawings.

Figure 1:
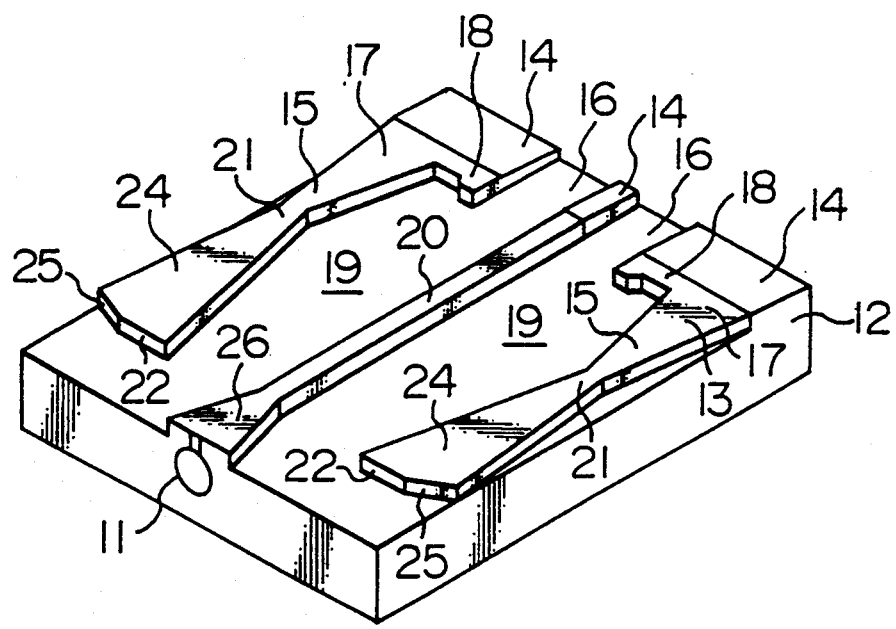
FIG. 1 is a perspective view of an air bearing surface side of a first embodiment of a flying head slider utilizing a negative pressure according to the present invention.
Figure 2:
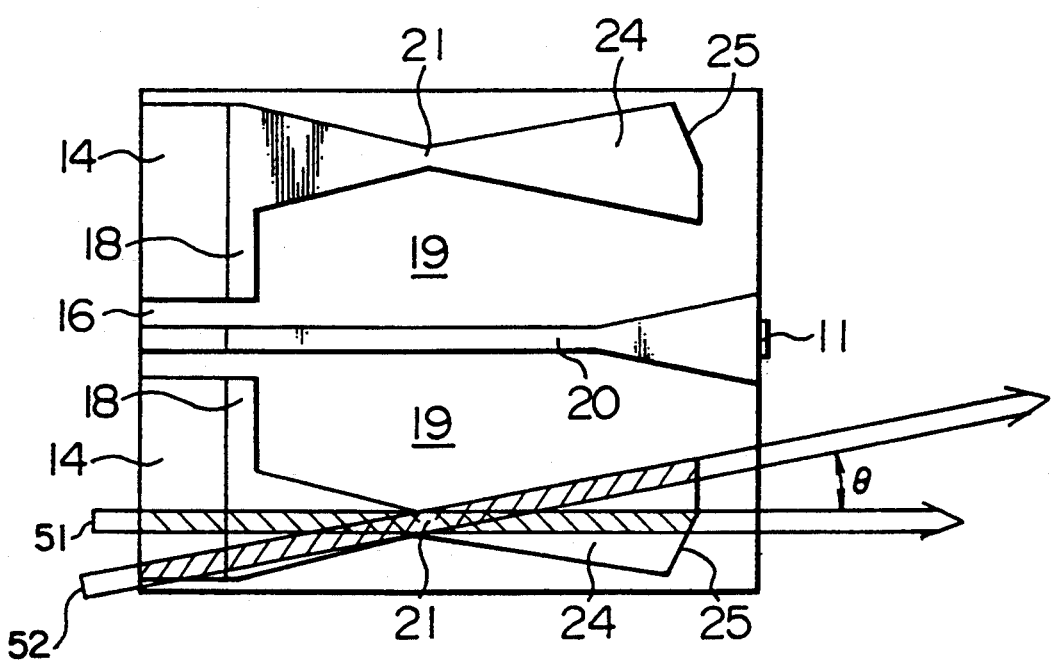
FIG. 2 is a plan view of the first embodiment.

In FIG. 1, an air bearing surface 13 of a slider 12, which is arranged to face a rotating recording medium, has a pair of positive pressure generating surfaces (hereinafter referred to as side rails) 17 extended in the longitudinal direction on both longitudinal sides. Each of the side rails 17 comprises a sloped surface 14 near the inlet side and a flat surface 15, and has a narrow portion 21 where the rail width is once narrowed in a direction from an inlet end toward an outlet end. The narrow portion 21 is located at a position offset from a center of the slider in the longitudinal direction nearer to the inlet end. In this first embodiment, both side edges of the side rail are inclined toward the narrow portion 21. As shown in FIG. 2, the angle formed between a longitudinal axis of the slider and either side edge of the side rail rearwardly of the narrow portion is selected to be almost equal to the sum of a yaw angle produced when the slider is mounted on a magnetic disk apparatus and a yaw angle produced at the innermost periphery during seek. A rear bearing surface 24 of the side rail gradually spreading from the narrow portion 21 toward the outlet side in the transverse direction terminates at a rear end 22 of the side rail, and does not reach the outlet end of the slider.

A cross rail 18 extending from the respective side rails 17 in the transverse direction is provided on the inlet side of the slider. The cross rail 18 and the side rails 17 cooperatively define a recess (hereinafter referred to as a negative pressure pocket) 19. The sloped surface 14 is also formed to the cross rail 18 at its inlet side. At the center of the slider in the transverse direction, there is provided a central positive pressure generating surface (hereinafter referred to as a center rail) 20 which divides the negative pressure pocket 19 into two parts and extends from the inlet end to the outlet end thoroughly. A pair of grooves 16 having the same depth as the negative pressure pocket 19 is formed along the center rail 20 to extend from the negative pressure pocket 19 to the inlet end.

The width of the center rail 20 is narrow, e.g., about 100 μm, and substantially uniform. The center rail 20 has a divergent portion 26 flaring in the form of a triangle from a position spaced from the slider center toward the outlet end, the divergent portion 26 terminating at the outlet end. A transducer 11 is mounted on a rear end surface of the center rail 20. The negative pressure pocket 19 and the grooves 16 are formed by ion milling or the like and are as shallow as not larger than about 10 μm, for example.

Further shown in FIG. 2 are an airstream 51 without a yaw angle, and an airstream 52 with a yaw angle.

Figure 3:
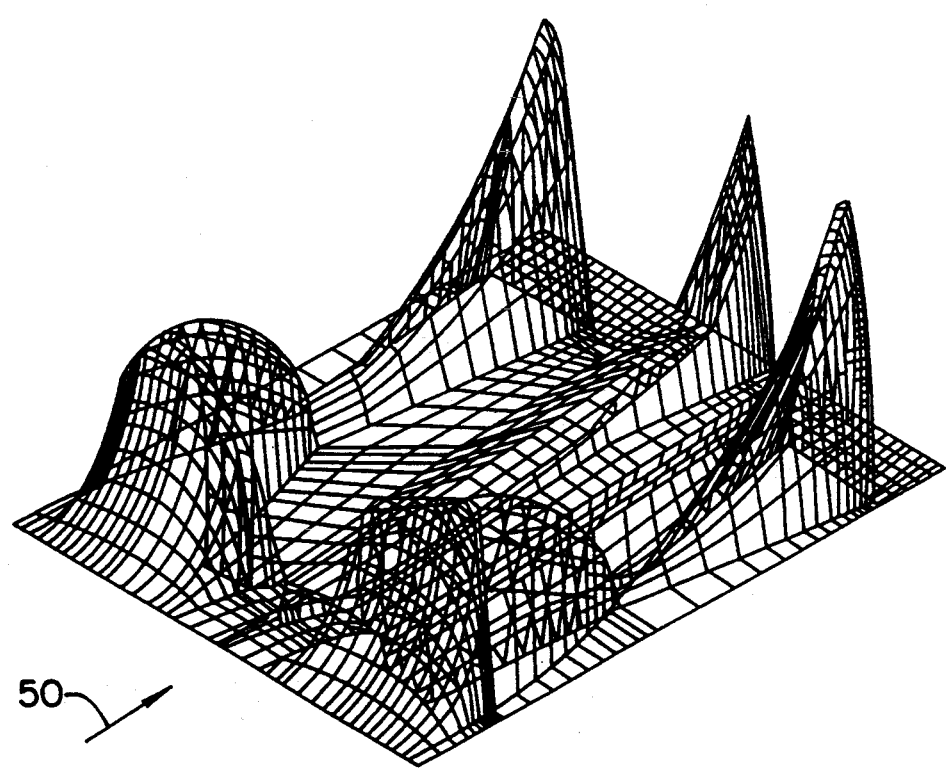
FIG. 3 is a perspective view showing pressure distribution in the first embodiment.
Figure 4:
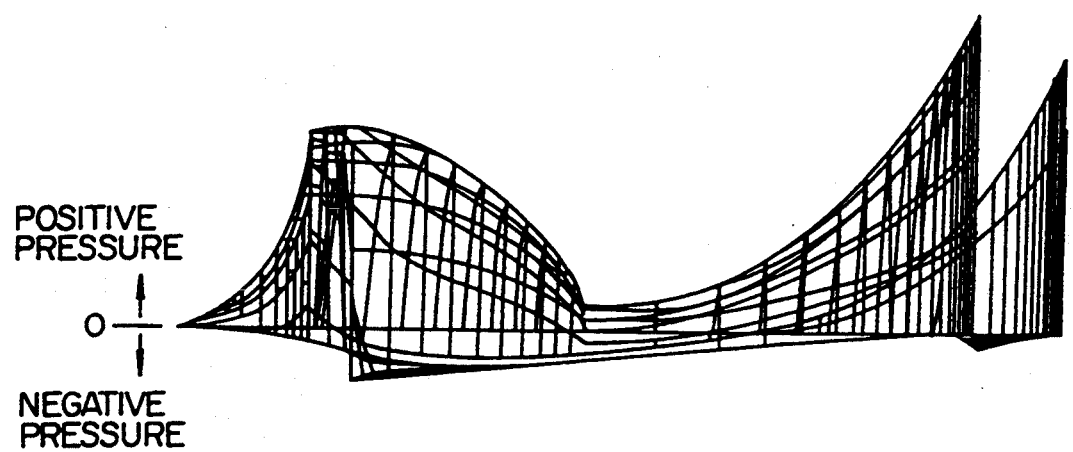
FIG. 4 is a side view showing the pressure distribution in the first embodiment.

Referring to FIGS. 3 and 4, the air stream 50 produced by rotation of the recording medium is compressed by the sloped surfaces 14 provided on the inlet side of the slider to have an increased pressure. Those air streams on both the transverse sides of the slider advance along the side rails 17. Those air streams other than that advancing along the slider center in the transverse direction are expanded in the negative pressure pocket 19 after passing the cross rails 18, and then advance toward the outlet end under a pressure lower than the ambient pressure, i.e., a negative pressure. Those air streams flowing through the grooves 16 on the inlet side directly enter the negative pressure pocket 19 without increasing their pressure, and act to weaken the negative pressure produced in the negative pressure pocket 19. The air stream advancing along the center rail 20 undergoes a negative pressure on the inlet side, where the rail width is narrow, under an influence of the negative pressure in the negative pressure pocket 19 on both sides of the center rail, and then undergoes a positive pressure only on the outlet side where the divergent portion 26 is formed. Those air streams advancing along the side rails 17 are subjected to an abrupt pressure fall owing to both side flows and pouring into the negative pressure pocket 19 caused by a reduction in the rail width at the narrow portion 17. After that, the pressure of those air streams is increased again along the rear bearing surfaces 24 and become once a little negative pressure at the rear ends 22 of the side rails, followed by returning to the ambient pressure.

With such a configuration that the narrow portions where the rail width is once narrowed in the direction from the inlet side toward the outlet side are formed substantially at the centers of the pair of positive pressure generating surfaces in the longitudinal direction (i.e., in the direction from the inlet side toward the outlet side) which are provided on both the transverse sides of the slider, a difference between the effective area of the positive pressure generating surfaces when no yaw angle is produced and the effective area of the positive pressure generating surfaces when a yaw angle is produced can be held down small. When a yaw angle is produced, the flying height of the flying surface is usually lowered on the inlet side. However, the spread of the rail width toward the slider center functions to increase the flying force for the flying surface and acts to suppress an inclination of the slider in the transverse direction. Particularly, by forming the rear ends of the positive pressure generating surfaces not to reach the outlet end and to have oblique edges (25 described later) extending in directions from both side edges of the slider to the centers of the outlet end, the rail length on the outlet side from the narrow portions measured when a yaw angle is produced can be made larger than that measured when no yaw angle is produced, which acts to suppress a reduction in the flying height due to a yaw angle. Further, since the pressure is distributed separately in the longitudinal direction of the slider, rigidity of the slider in the pitching direction is intensified.

Figure 5:
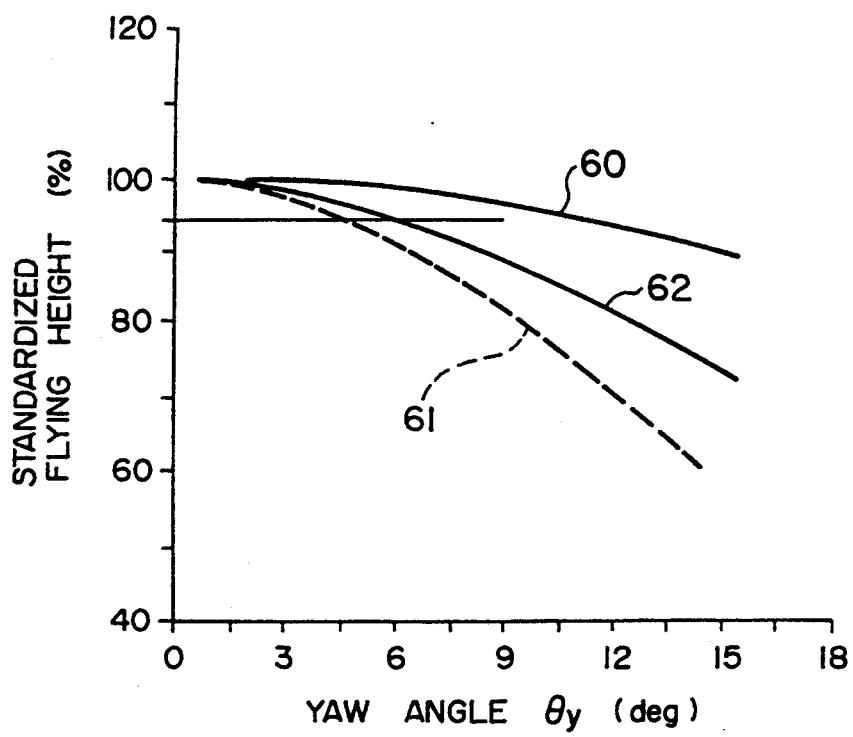
FIG. 5 is a graph showing results of comparing yaw angle characteristics between the sliders of the first embodiment and prior art.

FIG. 5 is a graph for explaining characteristics of the flying height when a yaw angle is produced in the slider of the first embodiment of the present invention. As will be seen from FIG. 5, a reduction in the flying height can be made smaller in the slider of this embodiment (curve 60) than in prior art sliders of taper/flat type (curve 61) and negative pressure type (curve 62).

The negative pressure acting in the negative pressure pocket 19 and the configuration of the side rails 17 for suppressing a reduction in the flying height when a yaw angle is produced, are effective in reducing an effect of the bearing action on the inlet side upon the area downstream of the narrow portions 21. Each of the rear bearing surfaces 24 exhibits substantially characteristics of an independent flat bearing. With the narrow portion 21 located at a position offset from the slider center in the longitudinal direction nearer to the inlet end, the area of the rear bearing surface 24 can be increased to a larger extent. Also, by adjusting the position of the narrow portion 21, a flying attitude of the slider 12 can be controlled. As a result, the flying force produced by an increase in the speed becomes smaller than in the prior art slider of taper flat type. On the other hand, with such a structure that the sloped surfaces 14 are also provided on the inlet side of the cross rails 18 so as to generate a larger positive pressure in the inlet portion, a flying attitude angle of the slider is increased at higher speeds. Thus, the flying height at the rear ends 22 of the side rails 17 which are primarily producing the positive pressure is increased and, correspondingly, the flying force produced rearwardly of the narrow portions is reduced.

Figure 6:
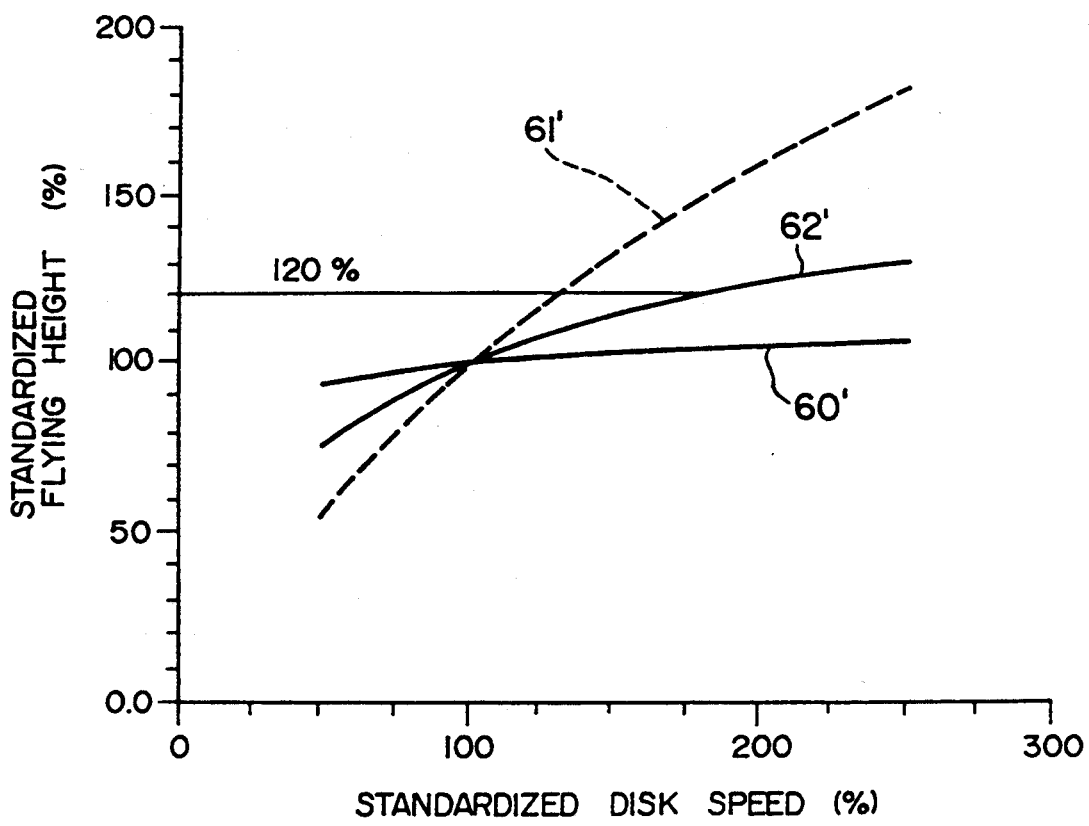
FIG. 6 is a graph showing results of comparing speed characteristics between the sliders of the first embodiment and prior art.

FIG. 6 is a graph for explaining speed characteristics of the slider of the first embodiment. In the slider of this embodiment (curve 60'), flying speed characteristics at the rear end of the center rail 20 can be improved and adjusted by the smaller negative pressure in the negative pressure pocket 19 than in the prior art slider of taper/flat type (curve 61') and negative pressure type (curve 62').

Utilizing the smaller negative pressure is effective in reducing a ratio of the negative pressure to the pressing load, making smaller changes in the negative pressure due to variations in size, e.g., depth, of the negative pressure pocket 19 which have been the problem to be solved for practical use, and hence suppressing variations in the flying height and the flying characteristics. Utilizing the smaller negative pressure is also effective in lessening an action of the negative pressure to collect dust during the flying. Another effect is in protecting the disk surface from damage which may possibly occur when the positive pressure bearing characteristics are deteriorated due to deposit of dust on the sloped surfaces 14 during the flying. It is further possible, in the contact start/stop system, to prevent the slider from crashing the medium with a shock caused upon the stop. As a result, the slider utilizing a negative pressure can also be employed with the contact start/stop system similarly to conventional positive pressure sliders.

The grooves 16 provided in the cross rails 18 to extend from the negative pressure pocket 19 to the inlet end have a function of bypassing air flowing into the negative pressure pocket 19, and adjust expansion of the air in the negative pressure pocket 19. As a result, the grooves 16 can adjust and weaken the negative pressure generated.

Figure 7:
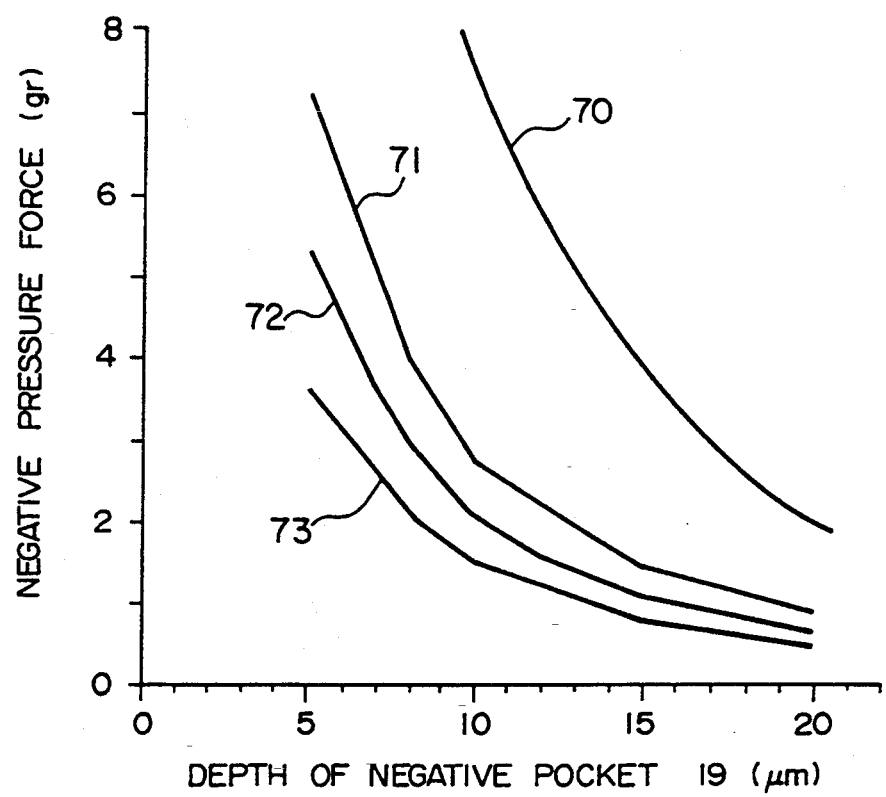
FIG. 7 is a graph showing a relationship among the depth of a negative pressure pocket, the width of a communicating groove, and the negative pressure produced in the first embodiment.

FIG. 7 is a graph for explaining a relationship between the depth of the negative pressure pocket 19 and the negative pressure with the width of the groove as a parameter in the first embodiment of the present invention. As seen from FIG. 7, at the depth larger than 4 μm where the flying speed characteristics are improved, the negative pressure is diminished as the depth of the negative pressure pocket 19 increases. To diminish the negative pressure to 2 gf, for example, the depth of 20 μm is required in the case of having no grooves (curve 70), while that negative pressure can be achieved at a half depth, i.e., 10 μm, in the case (curve 72) of having the grooves 16 (given the groove width as 200 μm in this example). Further shown in FIG. 7 are a case (curve 71) having a groove width of 150 mm and a case (curve 73) having a groove width of 250 mm.

Figure 8:
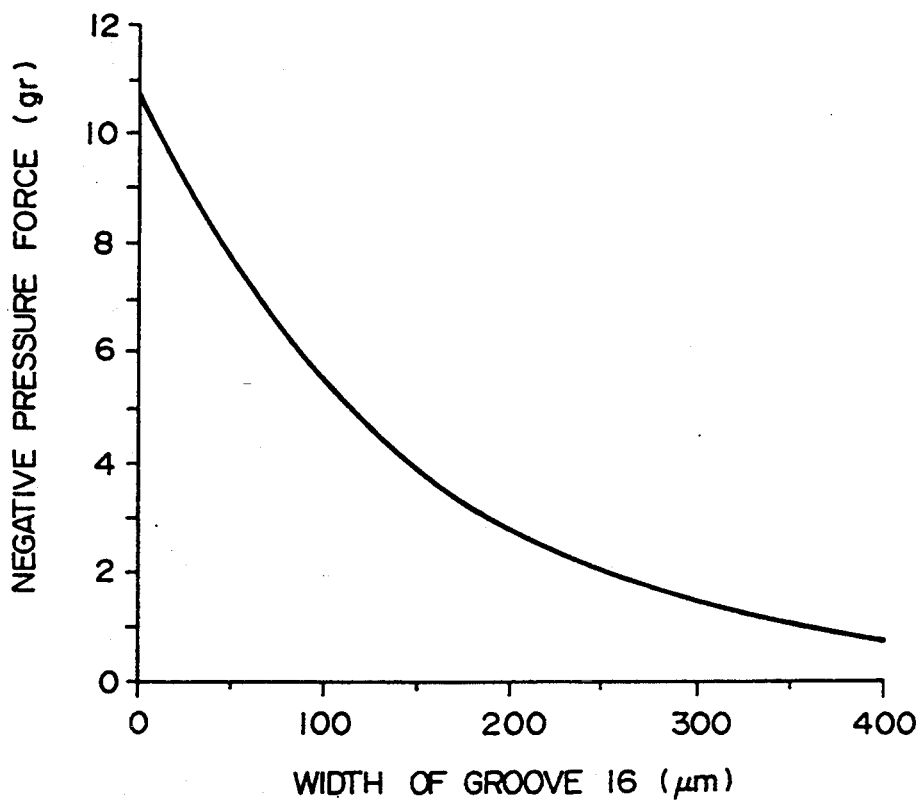
FIG. 8 is a graph showing a relationship between the width of the communicating groove and the negative pressure in the first embodiment.

FIG. 8 is a graph for explaining a relationship between the groove width and the negative pressure, given the pocket depth being fixed, in the slider according to the first embodiment of the present invention. As will be seen, the negative pressure can be adjusted by properly selecting the width of each groove 16. For example, by setting the groove width to 100 μm, the negative pressure can be diminished down to a half. This means that the grooves 16 and the negative pressure pocket 19 can be formed by one step if they are selected to the same depth.

Figure 9:
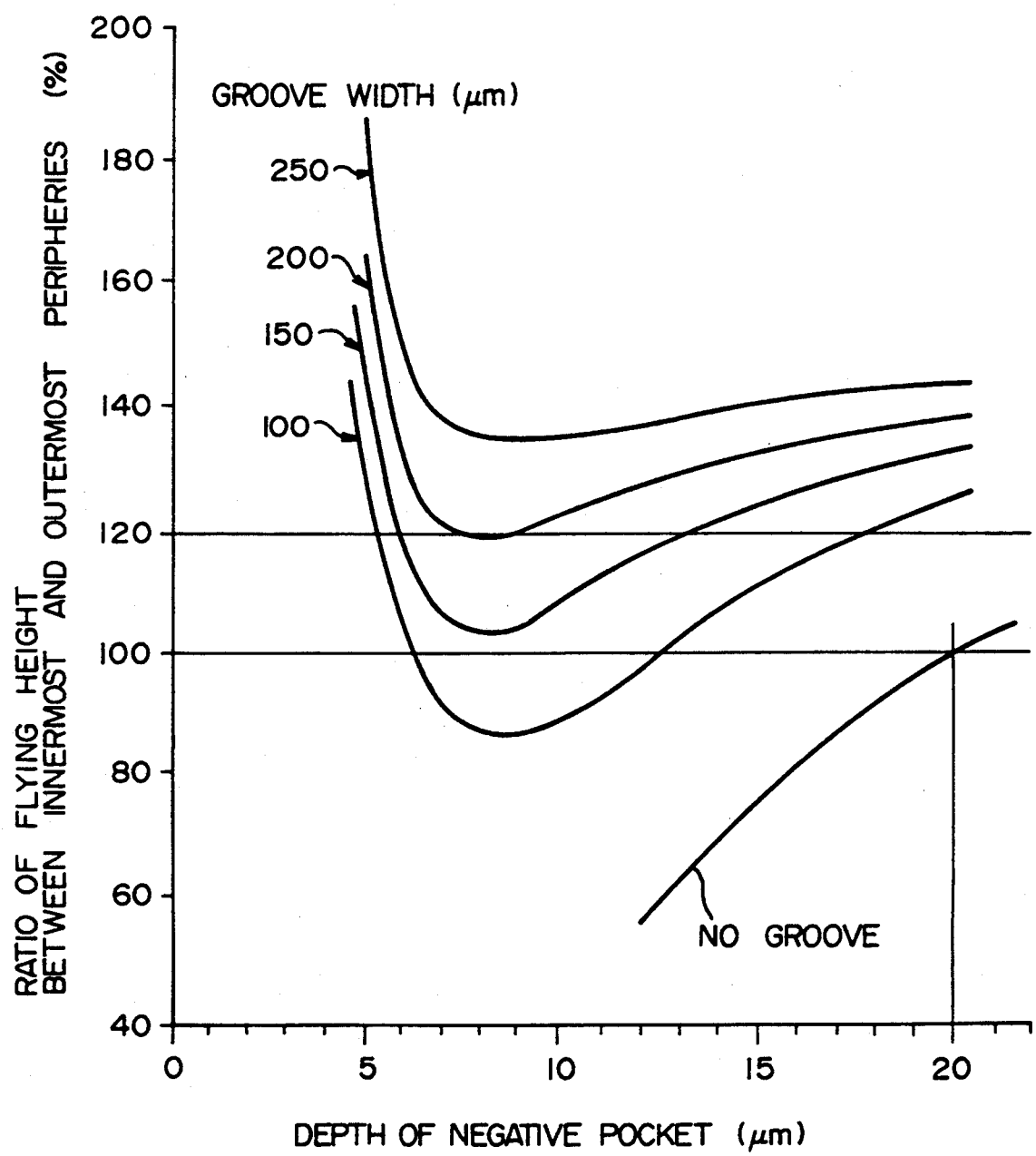
FIG. 9 is a graph showing a relationship among the depth of the negative pressure pocket, the width of the communicating groove, and the ratio of slider flying height between inner and outer peripheral positions of a recording medium in the first embodiment.

FIG. 9 is a graph for explaining a relationship among the groove width, the depth of the negative pressure pocket, and flying speed characteristics in the slider according to the first embodiment of the present invention. In the graph of FIG. 9, the vertical axis represents a ratio of slider flying height between inner and outer peripheries at a fixed disk speed. In the conventional case of having no grooves, if the depth of the negative pressure pocket 19 is shallower than 20 μm, the flying height ratio becomes lower than 100% and, in the worst case, the slider does not fly at the outer periphery. On the contrary, in the case of having the grooves 16, any desired characteristics can be selected at the groove width larger than 6 μm. As a result, the provision of the grooves 16 is effective in diminishing the negative pressure, stably flying the slider, cutting down the cost due to a reduction in the processing time, and stabilizing characteristics due to improvement of the depth accuracy. Further, since the cross rails 18 form positive pressure areas, but the grooves 16 form negative pressure areas, a part of dust entering from the inlet side that advances near the slider center is purged through the grooves 16 while bypassing the cross rails 18, thereby providing a dust purging effect.

Figure 10:
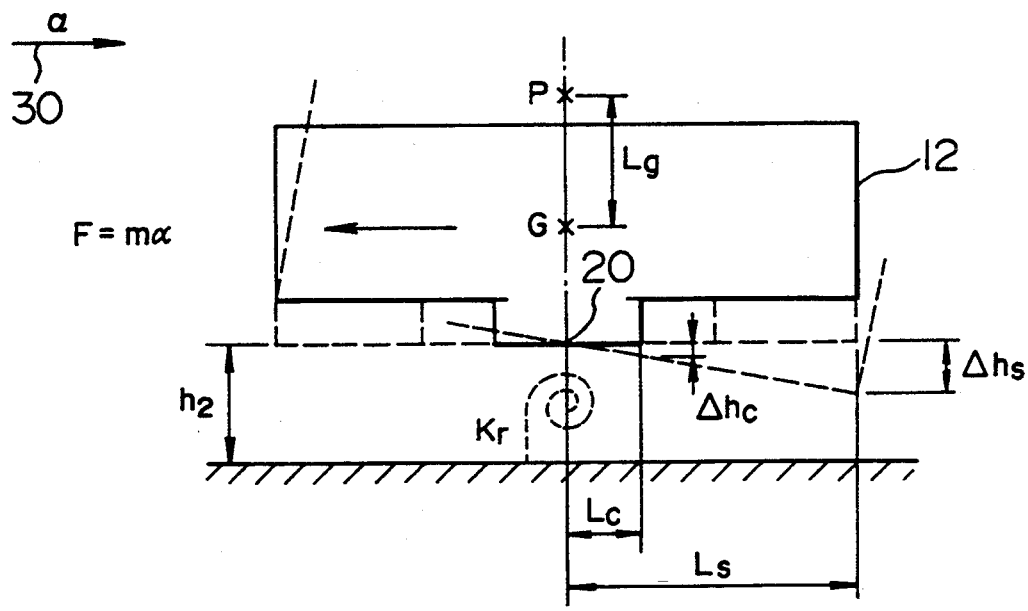
FIG. 10 is a rear view of the slider for explaining variations in the flying height under rolling in the first embodiment.

FIG. 10 is a rear view of the slider for explaining variations in the flying height along the rolling direction in the first embodiment of the present invention. In FIG. 10, when an access mechanism is moved at an acceleration α in the radial direction indicated by an arrow 30 during the seek operation, the force of inertia F=mα acts at the center C of gravity of the slider 12 in a direction opposite to the arrow 30. Assuming that the distance from the center C of gravity of the slider 12 to the center P of rotation of a support for supporting the slider 12 is Lg and the restoring spring rigidity of the air bearing in the rolling direction when the slider is flying with the flying height h2 at the outlet end is Kr, the variations Δh in the flying height due to rolling of the slider 12 caused by the above force of inertial is approximately expressed by the following Equation (1);

$$\Delta h = m\alpha\, Lg\, Ly/Kr \tag{1}$$

where Ly is the distance from the slider center in the transverse direction.

A ratio of the flying height variations at the slider end (distance; Ls) to the flying height variations at the end of the center rail 20 (distance; Lc) is given by:

$$\Delta hs/\Delta hc = Ls/Lc \tag{2}$$

Thus, if the side rails extend until the outlet end, one end of the slider undergoes the maximum flying height variations and provides the minimum flying height, and the flying height variations at the rear end of the center rail 20 is smaller by amounts corresponding to the above distance ratio.

Figure 11:
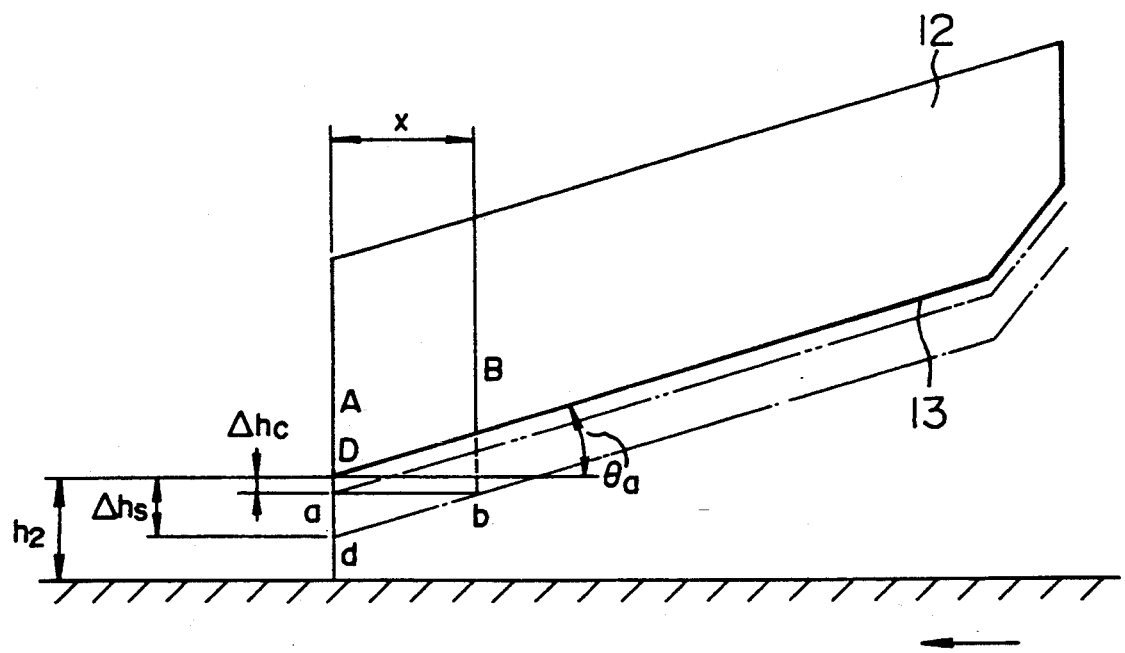
FIG. 11 is a side view of the slider for explaining variations in the flying height under rolling in the first embodiment; in which solid lines indicate a central section of the slider in the longitudinal direction, a one-dot-chain line indicates an outer edge of a side rail, and a two-dot-chain line indicates an outer edge of a central rail.

FIG. 11 shows a relationship between the flying height variations and a flying attitude in the first embodiment of the slider of the present invention. As will seen from FIG. 11, because the slider 12 flies by utilizing a wedge effect of the air bearing, it is flying with the inlet end lifted at an angle of θa. In the illustrated varying condition of the flying height, the same plane as corresponding to the flying height (h2−Δhc) at the end of the center rail 20 is the ab plane and the area where the flying height is not greater than (hc−Δhc) is the area defined by a, b, d.

Figure 12:
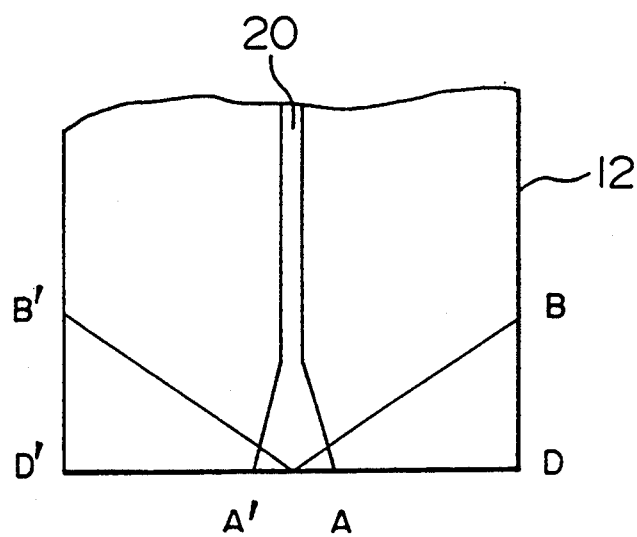
FIG. 12 is a bottom view of the slider for explaining oblique edges at rear ends of the side rails in the first embodiment.

FIG. 12 shows the area a, b, d in FIG. 11 when viewed on the air bearing surface of the slider. Referring to FIG. 12, in the area of the triangle ABD, the flying height is not greater than the flying height (hc−Δhc) at the end of the center rail 20. Accordingly, by shifting the rear end 22 of the side rail 17 from the outlet end (A) of the slider 12 to a position nearer to the inlet end than the point (B) such that the rear end of the side rail is not located within the triangle ABD, the rear end of the center rail 20 can be a point providing the minimum flying height at all times during the seek operation.

Assuming that the distance from the slider outlet end to the point (B) is x, x should be given by:

$$x \geq (\Delta hs - \Delta hc)/\tan\theta a \geq (1 - Lc/Ls)\Delta hs/\tan\theta a \tag{3}$$

Thus, the conditions for determining the point (B) are changed depending on the ratio of the distance to the angle. In a particular embodiment, the distance x is not smaller than 1/10 of the entire slider length.

The restoring spring rigidity Kr of the air bearing in the rolling direction, which is one factor determining the magnitude of flying height variations is almost inversely proportional to the flying height. The flying height at the point (B) is expressed by;

$$hx = h2 + x \cdot \tan\theta a \tag{4}$$

and, therefore, the restoring spring rigidity Kr of the air bearing in the rolling direction is expressed by:

$$Kr = h2/hx = 1/\{1 + (1 - Lc/Ls)\Delta hs/h2\} \tag{5}$$

Thus, the rigidity is reduced just by amounts corresponding to the term (1−Lc/Ls) representing the ratio between the distances to the respective rail ends and the term Δhs/h2 representing the ratio of the flying height variations at the slider end to the flying height at the outlet end. Given Lc/Ls=⅓ and Δhs as 20% of the flying height, for example, the rigidity Kr is reduced only to 15/17 and the flying height variations at the rear end of the center rail 20 can be reduced to (17/45)Δhs. By forming the rear end 22 of the side rail to have the oblique edge 25 in agreement with the segment AB in FIG. 12, the rigidity can be further reduced.

Figure 13:
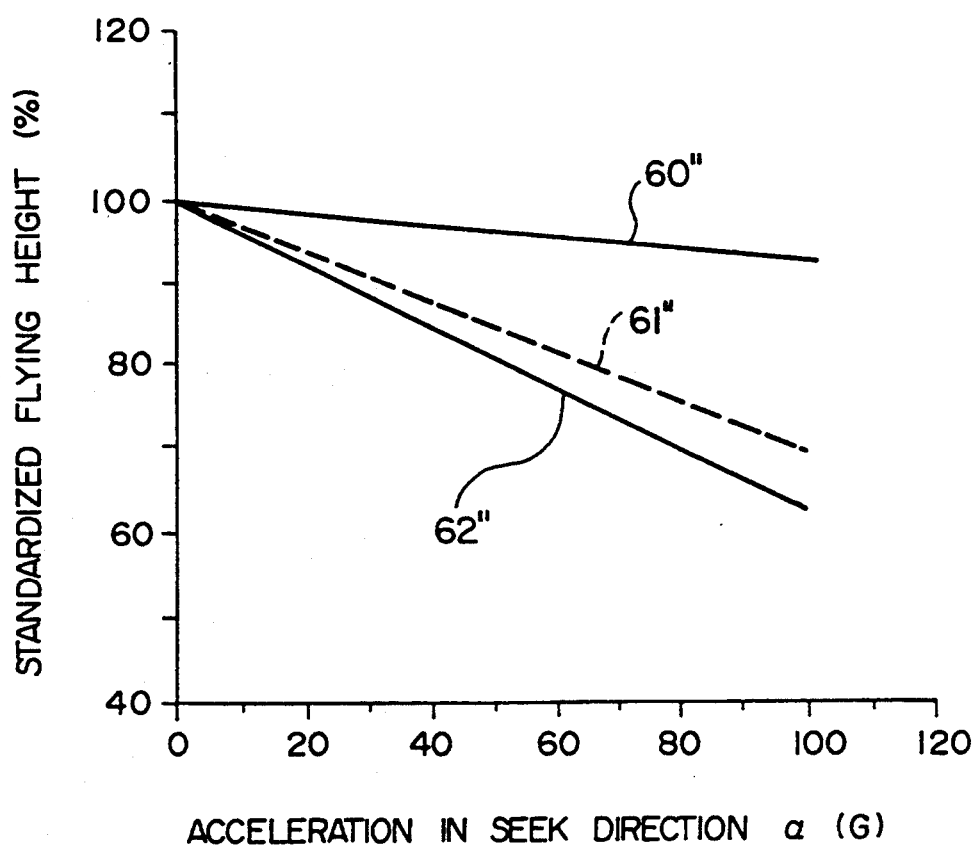
FIG. 13 is a graph showing results of comparing sink characteristics depending on acceleration between the sliders of the first embodiment and prior art.

FIG. 13 is a graph for explaining sink characteristics depending on acceleration in the first embodiment of the slider of the present invention. As will be seen from FIG. 13, the flying height can be remarkably improved in this embodiment (curve 60″) as compared with the prior art sliders of the taper/flat type (curve 61″) and negative pressure type (curve 62″).

By selecting the area of the center rail 20 to be smaller than the total area of both the side rails 17 rearwardly of the loading point, the flying force is primarily produced by the side rails 17, which results in the greater rolling rigidity. The above selection also suppresses the positive pressure generated by the center rail 20, enabling the above-mentioned speed characteristics to be achieved at a smaller negative pressure. Further, the positive pressure generated by the center rail 20 acts to ensure the pitching rigidity and the ability of following the disk.

Figure 14:
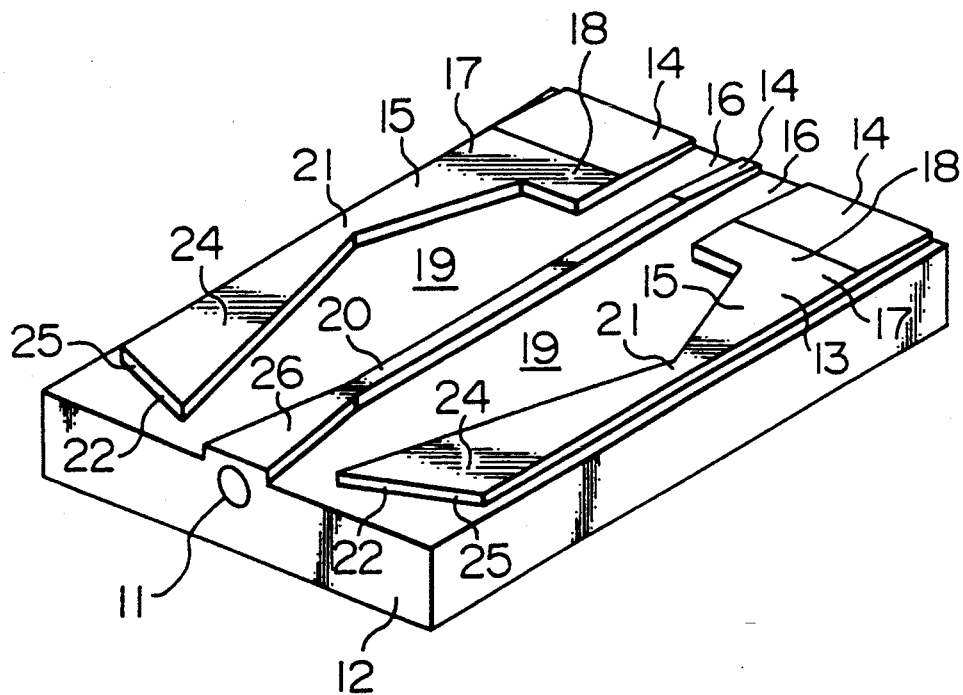
FIG. 14 is a perspective view of the air bearing surface side of a second embodiment of the flying head slider utilizing a negative pressure according to the present invention.

FIG. 14 is a perspective view showing a second embodiment of the present invention. In this embodiment, the side rails 17 are formed to have linear outer edges. The angle at which the rail width is changed on forwardly and rearwardly of the narrow portion 21 is almost the same as the sum of the angles at which both the side edges of the side rail are inclined in the first embodiment. By making the outer side edges of the side rails 17 linear, the center-to-center distance between the side rails can be essentially increased for improvement of the rolling rigidity. Another advantage is in simplifying the shape of the air bearing surfaces and holding down variations in the flying height due to dimensional errors in manufacture.

Figure 15:
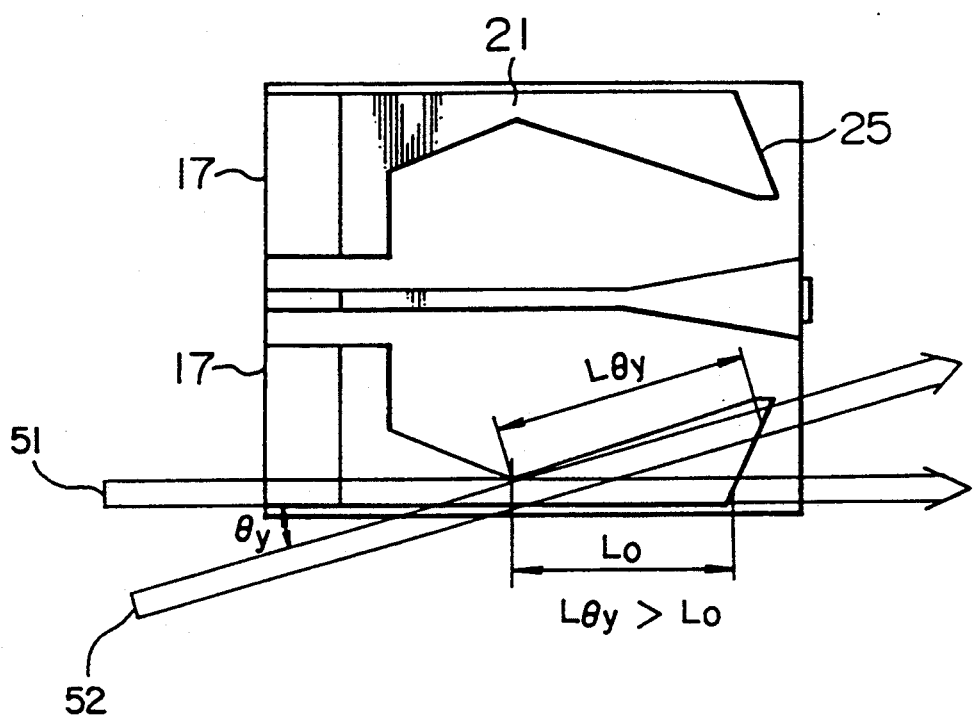
FIG. 15 is a bottom view of the second embodiment of the present invention, showing an air stream on the side rail when a yaw angle is produced.

FIG. 15 is a bottom view for explaining a reduction in the flying height with a yaw angle produced in the second embodiment of the present invention. In this embodiment, the rear end 22 of the side rail 17 is formed to have an oblique edge 25 extending in a direction from the side edge of the slider toward the center of the outlet end. With such an arrangement, the length L$\theta$y from the narrow portion 21 to the side rail rear end 22 along which the air stream flows when a yaw angle is produced can be made greater than the length Lo from the narrow portion 21 to the side rail rear end 22 along which the air stream 51 flows when no yaw angle is produced. This is effective in increasing the positive pressure generated, with an advantage of further suppressing a reduction in the flying height due to a yaw angle.

Figure 16:
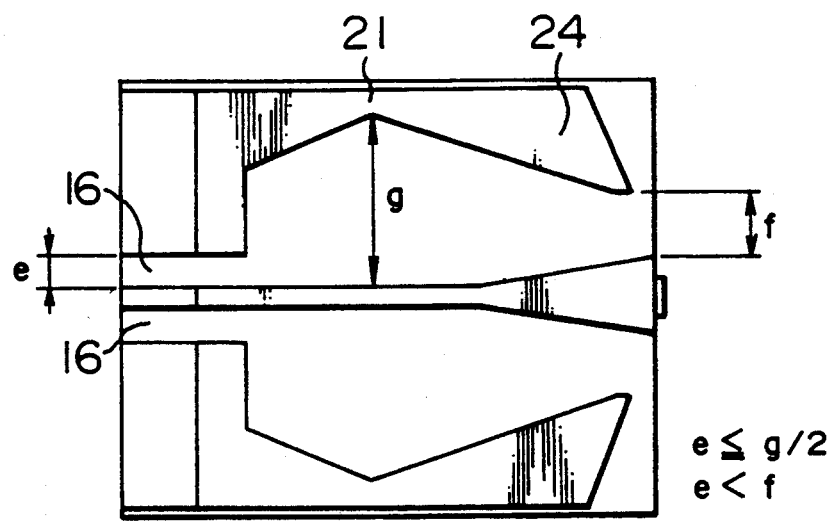
FIG. 16 is a bottom view of the second embodiment of the present invention, showing a dimensional relationship among the communicating groove, the negative pressure pocket and so on, FIG. 17 is a perspective view of the air bearing surface side of a third embodiment of the flying head slider utilizing a negative pressure according to the present invention.

FIG. 16 is a bottom view for explaining a relationship between the groove width and other dimensions in the second embodiment of the present invention. As will be seen from FIG. 16, in the present invention including this and above embodiments, the width e of the groove 16 is set to be smaller than the minimum distance f between the inner side of the side rail rear end 22 and the center rail 20. Also, the width e of the groove 16 is set to be smaller than half of the maximum width g of the negative pressure pocket 19. By so setting, a negative pressure can be stably generated in the negative pressure pocket 19.

Further, with such a structure that the pair of side rails are formed not to extent until the slider outlet end and the center rail width is selected to be able to mount the transducer, the position of minimum flying height can be always located at the outlet side end of the center rail during the flying of the slider. Also, since those forces for resisting variations in the flying height in the rolling direction are attributable to the rolling rigidity provided by the pair of side rails, the flying height is less likely to vary to such an extent as corresponding to the ratio of the center rail width at its outlet side end to the slider width. Particularly, with such an arrangement that the rear ends of both the side rails at their side edges are selected to such positions that the side rail rear ends are not lower than the flying height at the outlet side end of the center rail when the slider is rolled, depending on the slider attitude, the acceleration in the seek direction during seek, the slider rolling rigidity, and the slider configuration, and that the side rail rear ends are formed to have oblique edges extending in directions from the side edges of the side rails thus selected toward the outlet side end of the center rail, the outlet side end of the center rail can be always a point providing the minimum flying height and the rolling rigidity can be improved.

Figure 17:
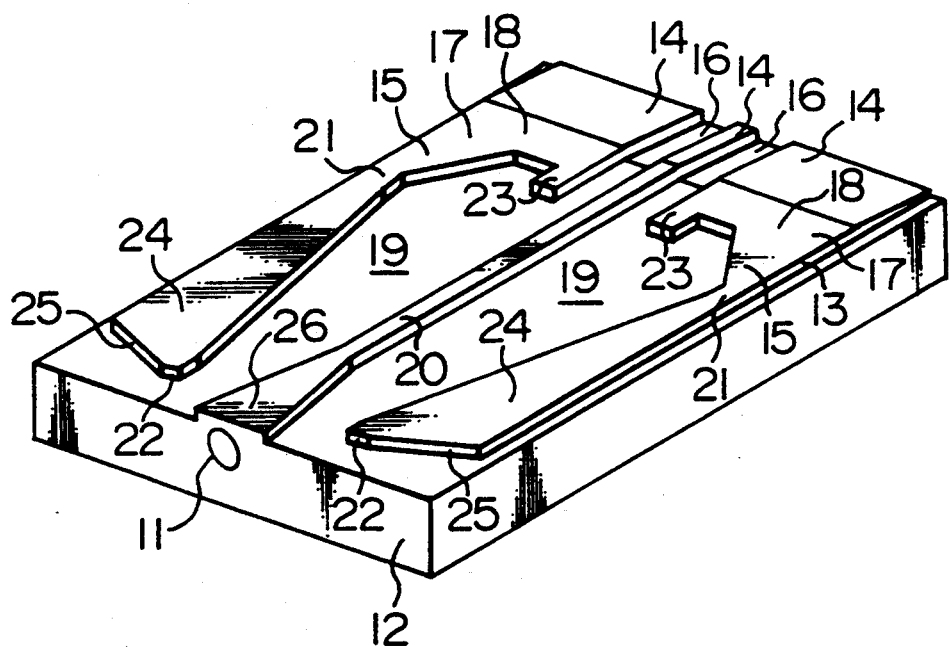

FIG. 17 is a perspective view showing a third embodiment of the present invention. In this embodiment, the groove 16 comprises a flat surface substantially at the same depth as the negative pressure pocket 19 and a sloped surface substantially parallel to the sloped surface 14, and a peninsula portion 23 projecting from the cross rail 18 toward the outlet side is provided outwardly of the groove 16. This configuration of the groove 16 is advantageous in enhancing the dust purging effect. Since the sloped surfaces 14 are formed prior to forming of the air bearing surface in the depthwise direction during manufacture, it is possible to reduce errors in the shape of the sloped surfaces 14 which could be caused by reversed manufacture steps, and to cut down the processing time. The peninsula portion 23 adjacent the groove 16 acts to prevent air from entering from the groove 16, thereby stabilizing generation of the negative pressure in the negative pressure pocket 19 defined by the peninsula portion 23 and the cross rail 18. As a result of providing the peninsula portion 23 to make the generated negative pressure constant, the width of the groove 16 can be made wider as another advantage.

Figure 18:
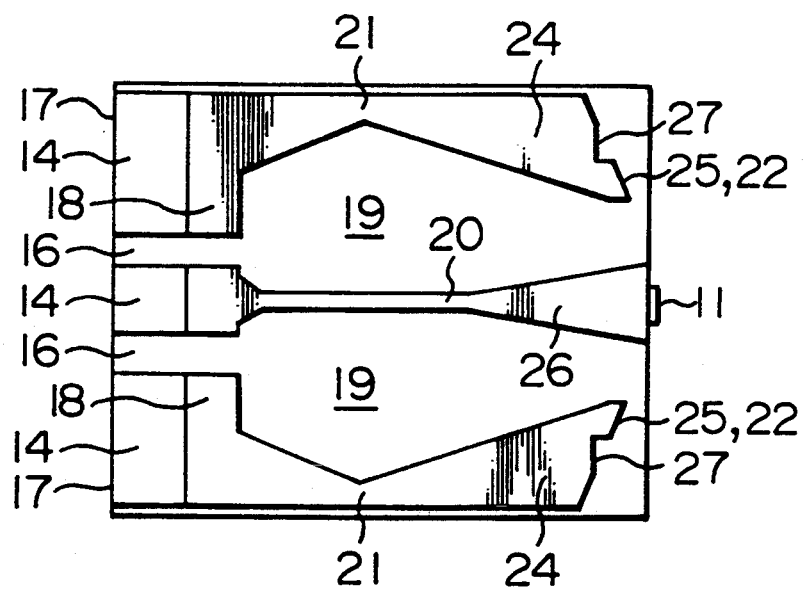
FIG. 18 is a bottom view of a fourth embodiment of the flying head slider utilizing a negative pressure according to the present invention.

FIG. 18 is a bottom view showing a fourth embodiment of the present invention. In this embodiment, the groove 16 is formed midway the cross rail 18. This arrangement can also provide the similar advantage. Further, in this embodiment, a cutout 27 is provided in the side rail rear end 22. The provision of the cutout 27 increases the negative pressure generated on the outlet side of the side rail rear end 22. As a result, variations in the flying height due to speed changes can be made smaller.

Figure 19:
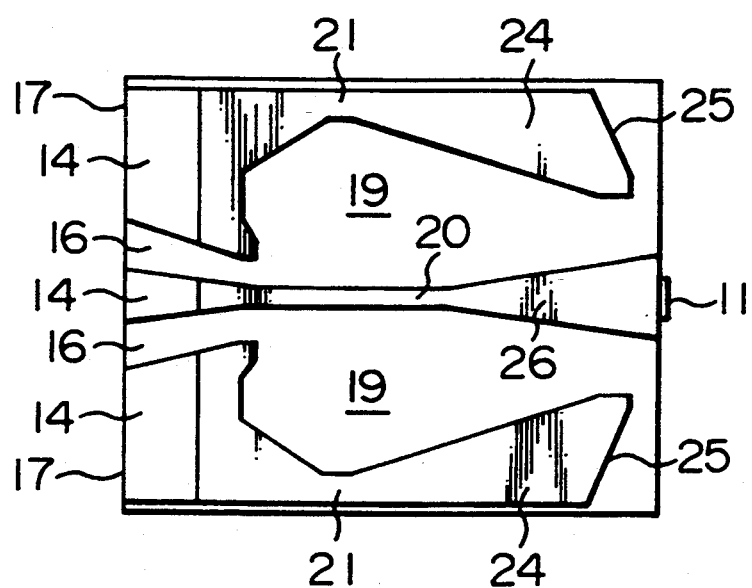
FIG. 19 is a bottom view of a fifth embodiment of the flying head slider utilizing a negative pressure according to the present invention.

FIG. 19 is a bottom view showing a fifth embodiment of the present invention. In this embodiment, the width of the groove 16 is gradually narrowed in the direction toward the outlet end. This arrangement is effective in enhancing the dust purging effect as a result of reducing the width of the sloped surface 14 of each side rail 17.

Figure 20:
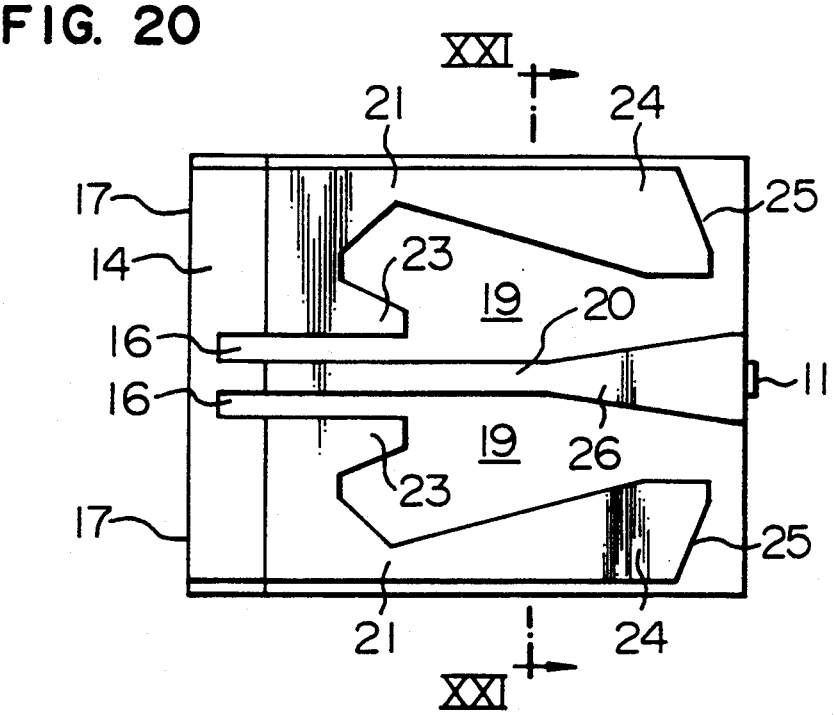
FIG. 20 is a bottom view of a sixth embodiment of the flying head slider utilizing a negative pressure according to the present invention.

FIG. 20 is a bottom view showing a sixth embodiment of the present invention. In this embodiment, the groove 16 is terminated midway the sloped surface 14. The sectional area on the inlet side of the groove 16 through which air flows in can be adjusted while holding the groove and the negative pressure pocket at the same depth, with an advantage of making the groove width wider. Also, the peninsula portion 23 may change in its width as shown.

Figure 21:
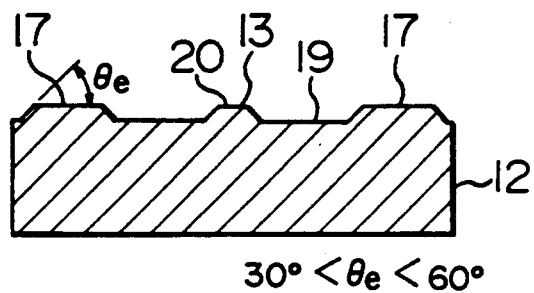
FIG. 21 is a sectional view taken along line XXI—XXI in FIG. 20.

FIG. 21 is a sectional view taken along line XXI—XXI in FIG. 20. The side edges of the rails, i.e., the stepped edges of the negative pressure pocket 19, are inclined at an angle θe ranging from 30 to 60 degrees. Including the other embodiments, reducing the angle θe is effective to suppress variations in the flying height because changes in the negative pressure due to varying depths of the negative pressure pocket 19 are cancelled by changes in the positive pressure due to the positive pressure rails.

Figure 22:
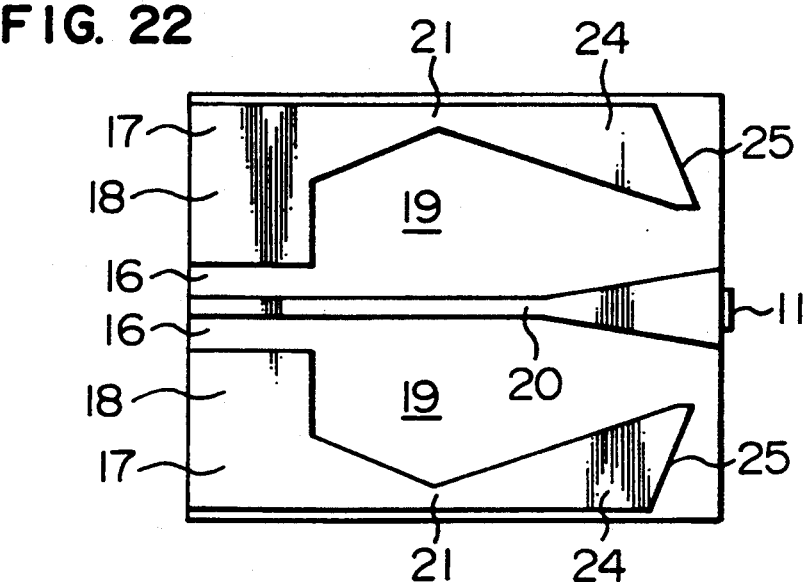
FIG. 22 is a bottom view of a seventh embodiment of the flying head slider utilizing a negative pressure according to the present invention.

FIG. 22 is a bottom view showing a seventh embodiment of the present invention. In this embodiment, the side rails 17 and the center rail 20 in the air bearing surface 13 are all flat. The absence of the sloped surfaces 14 is advantageous in improving the processing accuracy and cutting down the processing time.

Figure 23:
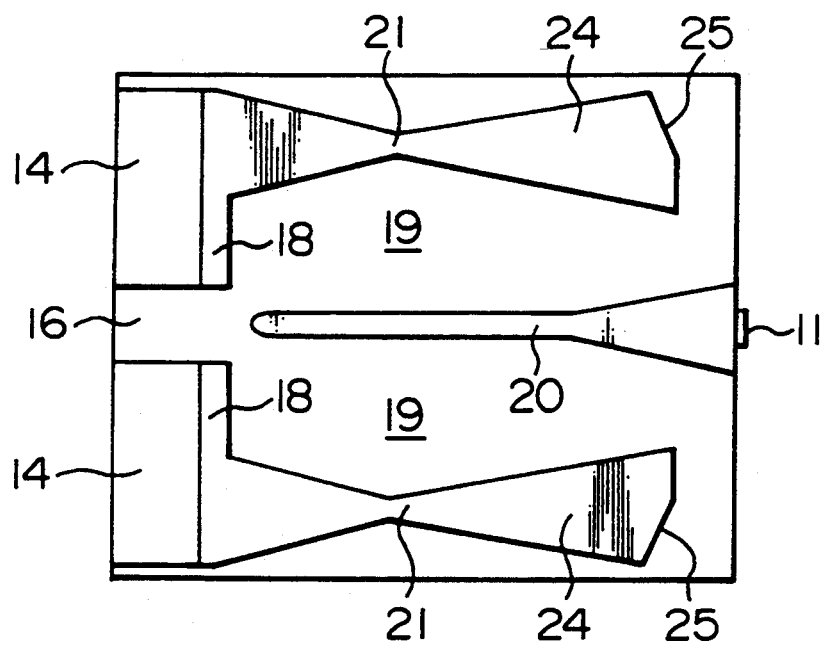
FIG. 23 is a bottom view of an eighth embodiment of the flying head slider utilizing a negative pressure according to the present invention.

FIG. 23 is a bottom view showing an eighth embodiment of the present invention. In this embodiment, one groove 16 is provided at the center between the cross rails 18, and the center rail 20 is terminated before the cross rails 18. With the single groove 16 having a large width, variations in the flying height depending on the variation of groove width can be reduced.

Figure 24:
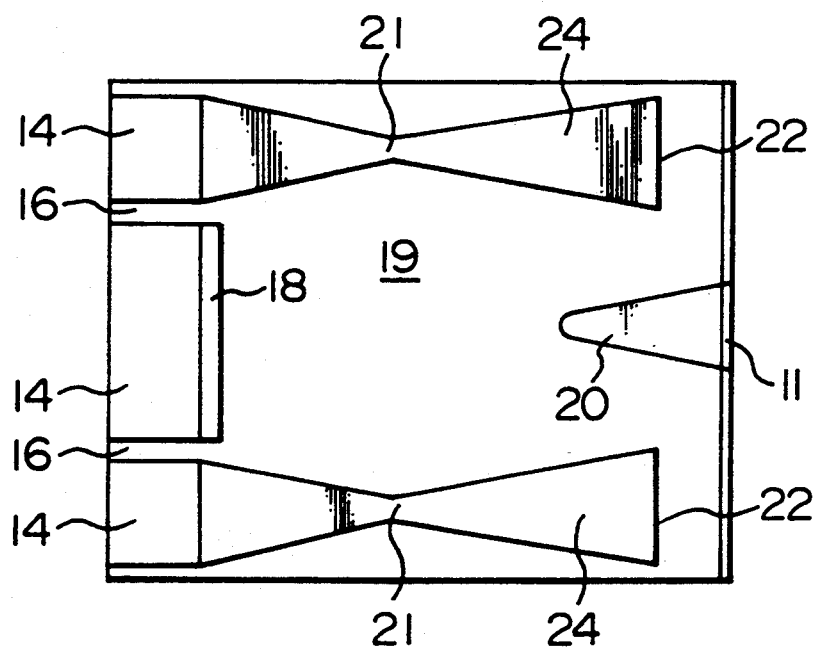
FIG. 24 is a bottom view of a ninth embodiment of the flying head slider utilizing a negative pressure according to the present invention.

FIG. 24 is a bottom view showing a ninth embodiment of the present invention. In this embodiment, the groove 16 is provided adjacent each side rail 17 and the side rail rear end 22 has no oblique edge. The performance of this embodiment is slightly deteriorated.

Figure 25:
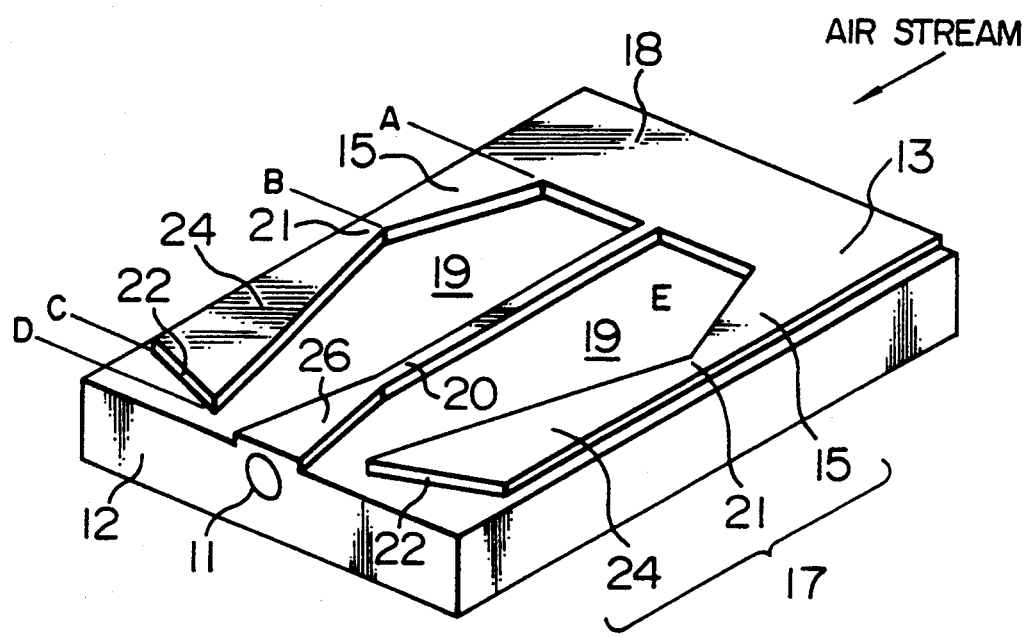
FIG. 25 is a perspective view of the air bearing surface side of a tenth embodiment of the flying head slider utilizing a negative pressure according to the present invention.
Figure 26:
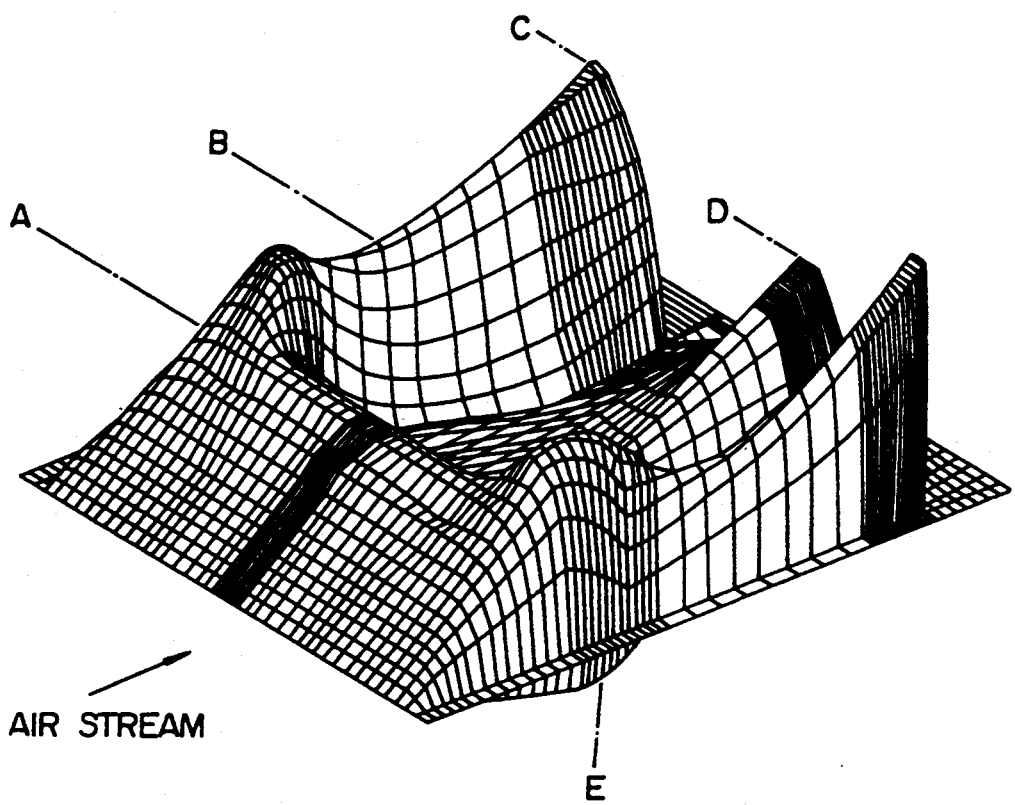
FIG. 26 is a perspective view showing pressure distribution in the tenth embodiment.

A tenth embodiment of the flying head slider according to the present invention will be described below with reference to FIGS. 25 and 26.

This tenth embodiment is identical to the seventh embodiment shown in FIG. 22 except for that the grooves 16 are omitted.

Operation of the air bearing of this embodiment will be described with reference to FIGS. 25 and 26. FIG. 26 is a perspective view showing pressure distribution in this embodiment. The air stream produced by rotation of the recording medium is gradually compressed due to continuous wedge-shaped gap in the air bearing surface 13 of the slider and increases in its pressure, indicated by A, almost linearly from the inlet side. Those air streams on both the transverse sides of the slider advance along the side rails 17. Those air streams other than that advancing along the slider center in the transverse direction are expanded in the negative pressure pocket 19 after passing the cross rails 18, and then advance toward the outlet end under a pressure lower than the ambient pressure, i.e., a negative pressure. The air stream advancing along the center rail 20 undergoes a negative pressure on the inlet side, where the rail width is narrow, under an influence of the negative pressure in the negative pressure pocket 19 on both sides of the center rail, and then undergoes a positive pressure on the outlet side where the divergent portion 26 is formed. Those air streams advancing along the side rails 17 are subjected to an abrupt pressure fall, indicated by B, owing to both side flows and pouring into the negative pressure pocket 19 caused by a reduction in the rail width at the narrow portion 17. After that, the pressure of those air streams is increased again along the rear bearing surfaces 24 to form peaks C, and then become once a little negative pressure at the rear ends 22 of the side rails, followed by returning to the ambient pressure.

With this embodiment, since no inclined surfaces are provided on the inlet side of the side rails 15 on both transverse sides of the slider 12 (i.e., because of the structure of the air bearing surface 13 having no inflection point), it is possible to eliminate the problem that the flying height is lowered due to a reduction in the positive pressure caused by deposit of dust on the inclined surfaces, as experienced in the conventional slider of taper/flat type. Even if dust deposits on the air bearing surface 13 during the flying, the structure of this embodiment enables the deposited dust to be removed by CSS or by an access to the disk (recording medium) surface. As a result, reliability for protection against dust can be ensured.

Also, with the structure of this embodiment, the side rails 17 develop linear positive pressure rising characteristics close to those by the flat bearing. Therefore, the flying force generated is less increased depending on an increase in the speed of the recording medium than the conventional slider of taper/flat type. In addition, the angle of elevation of the slider 12 in its flying attitude is increased at higher speeds. The gaps defined by the disk and those portions of the side rails which are not extended to the outlet end are thereby enlarged, allowing the air streams to more easily flow toward the outlet side. Correspondingly, the flying force produced by the rear bearing surfaces 24 downstream of the narrow portions 21 is reduced. As a result, even if the slider 12 has the size not larger than 2 mm and the area of the negative pressure pocket 19 is reduced, so that the negative pressure pocket 19 generates a smaller negative pressure, the outlet side end of the center rail 20 quickly flies at low speeds at which the negative pressure produced is small, and increases in the negative pressure and the flying force by the positive pressure due to increase of speed are balanced with each other, thereby suppressing variations in the flying height.

This embodiment is advantageous in that the configuration of the gas bearing surface is simple and, therefore, variations in the flying height due to dimensional errors in manufacture can be suppressed.

Figure 27:
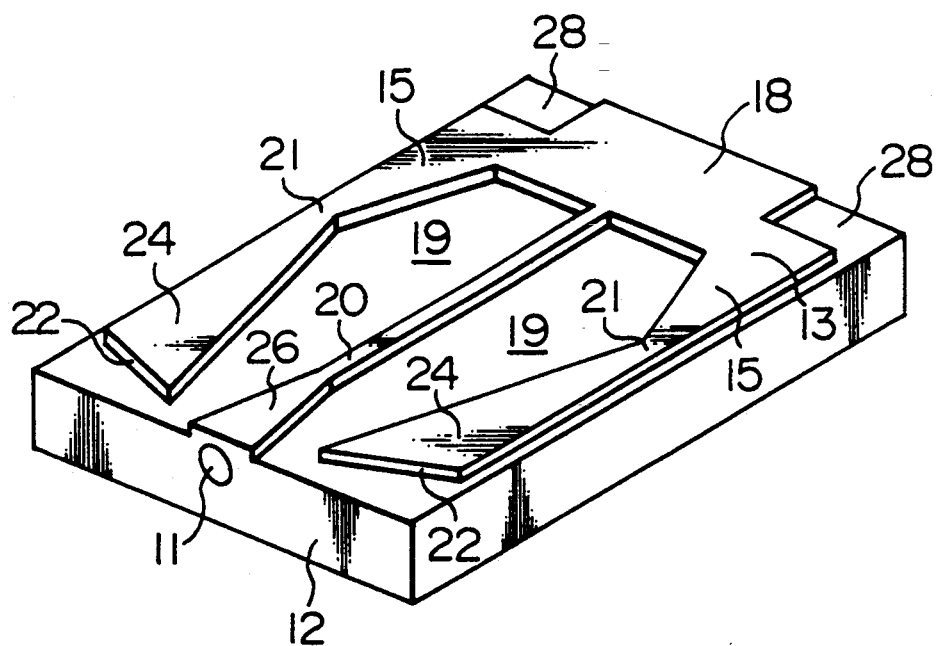
FIG. 27 is a perspective view of the air bearing surface side of an eleventh embodiment of the flying head slider utilizing a negative pressure according to the present invention.

FIG. 27 is a perspective view showing an eleventh embodiment of the present invention. In this embodiment, the side rails 17 and the center rail 20 are continuously formed on the inlet side by the single cross rail 18 to lie substantially in the same plane extending until the inlet end, and recesses (second recesses) 28 are formed at both corners of the slider at the inlet end. The depth of the recesses 28 are almost the same depth as the negative pressure pocket 19.

With this embodiment including the recesses 28, generation of the positive pressure can be prevented from being partial to the inlet side, and also held down to a lower level. As a result, even for the slider in which the negative pressure area and hence the negative pressure are diminished due to the reduced size, the speed characteristics of flight can be kept substantially constant. This embodiment further has a similar advantage to that of the above embodiment, which has no inclined surfaces, in relation to deposit of dust.

Figure 28:
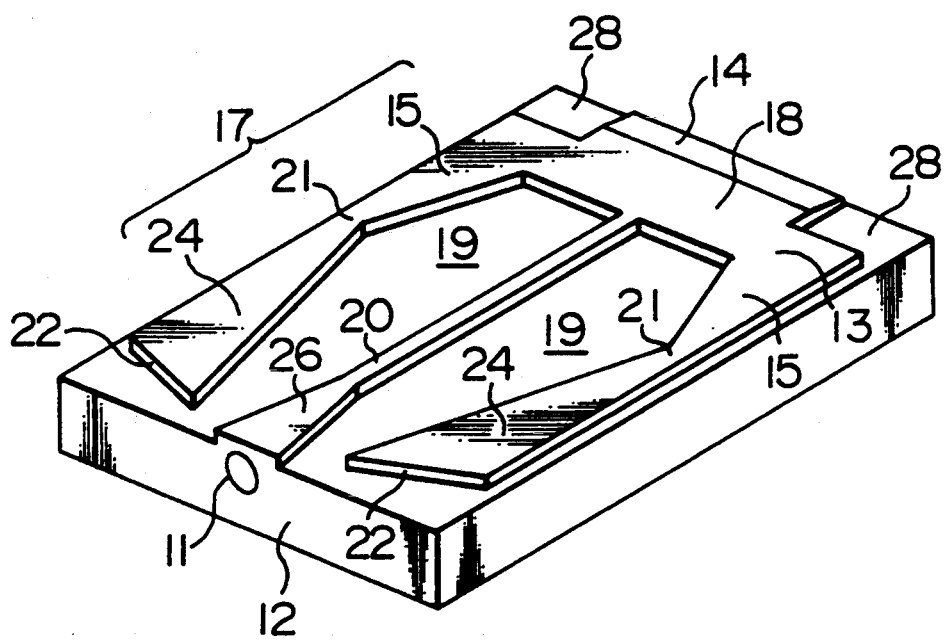
FIG. 28 is a perspective view of the air bearing surface side of a twelfth embodiment of the flying head slider utilizing a negative pressure according to the present invention.

FIG. 28 is a perspective view showing a twelfth embodiment of the present invention. In this embodiment, the side rails 17 and the center rail 20 are continuously formed on the inlet side by the single cross rail 18 to lie substantially in the same plane, with the single inclined surface 14 provided to extend from the cross rail 18 toward the inlet end, and the recesses 28 are formed at both corners of the slider at the inlet end.

With this embodiment, generation of the positive pressure by the side rails 15 can be adjusted by the structure including the recesses 28 to reduce the area of the inclined surface 14 which is part of the positive pressure rails. As a result, even for the slider in which the negative pressure area and hence the negative pressure are diminished due to the reduced size, the speed characteristics of flight can be kept substantially constant. It is also possible to reduce a contribution rate of the inclined surface to generation of the positive pressure, and alleviate the problem that the flying height is lowered by a reduction in the generated positive pressure due to deposit of dust on the inclined surface 14. Consequently, reliability of protection against dust can be ensured.

Figure 29:
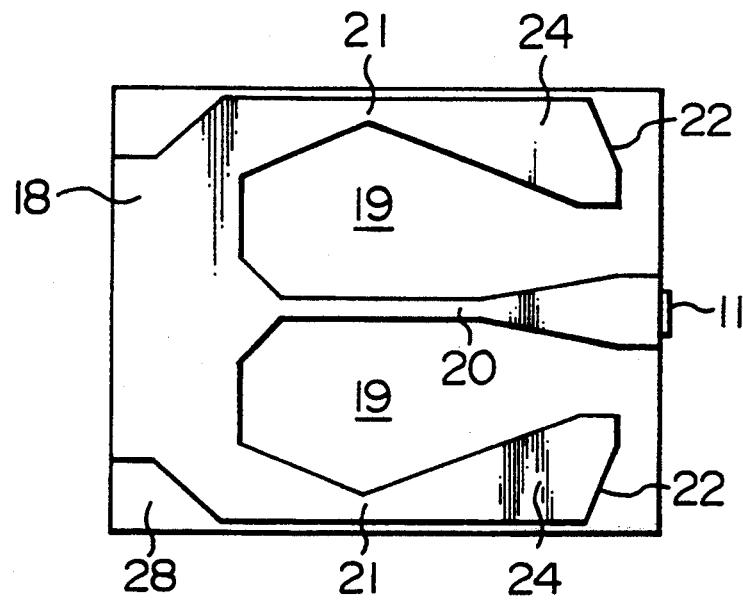
FIG. 29 is a bottom view of a thirteenth embodiment of the flying head slider utilizing a negative pressure according to the present invention.
Figure 30:
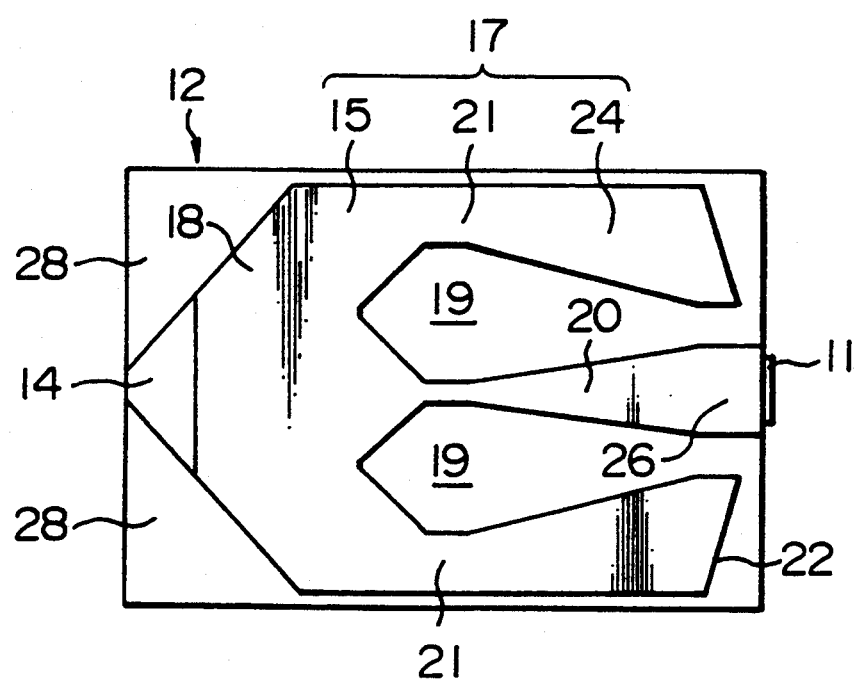
FIG. 30 is a bottom view of a fourteenth embodiment of the flying head slider utilizing a negative pressure according to the present invention.

FIG. 29 is a perspective view showing a thirteenth embodiment of the present invention. In this embodiment, the recesses (second recesses) 28 provided at both the corners of the slider at the inlet end are each formed by a straight portion parallel to the direction of air stream and a convergent portion. Further, the rear bearing surfaces 24 are each formed so that the side rail rear end 22 has an edge in its portion near the center rail 20 substantially parallel to the outlet end, and an edge substantially parallel to the side edge of the slider. In addition, the center rail 20 has on the outlet side thereof edges substantially parallel to the sides of the slider.

With this embodiment, dust is suppressed from gathering in the recesses 28 during the flying, with the result similar to that as mentioned above. By selecting the angle $\theta$ at the side rail rear end 22 at 90°, that rear end corner of the side rail can be formed by etching with good accuracy. Moreover, the parallel edges of the center rail 20 on the outlet side enables rail positioning to be automated in measurement of the flying height, which is effective to improve the accuracy in position of measuring the flying height.

A fourteenth embodiment of the flying head slider according to the present invention will be described below with reference to FIGS. 30 to 33.

This fourteenth embodiment is a modification of the twelfth embodiment shown in FIG. 28. In this embodiment, the second recesses 28 formed at both the corners of the slider at the inlet end is triangular in shape, and the cross rail 18 is wedge-shaped with its both edges on the inlet end side converging toward the inlet end.

Figure 31:
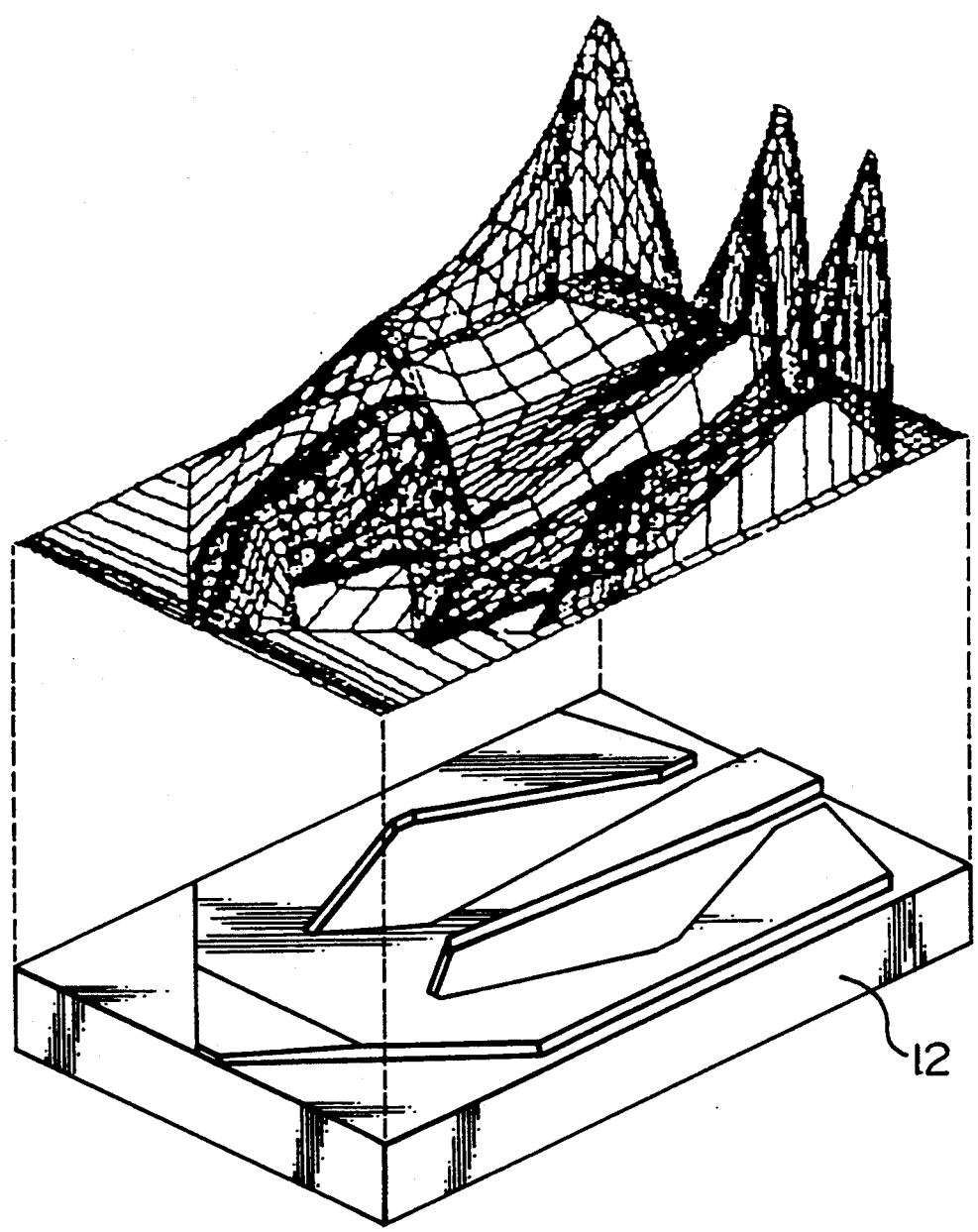
FIG. 31 is a perspective view showing an air bearing surface and pressure distribution in the fourteenth embodiment.
Figure 32:
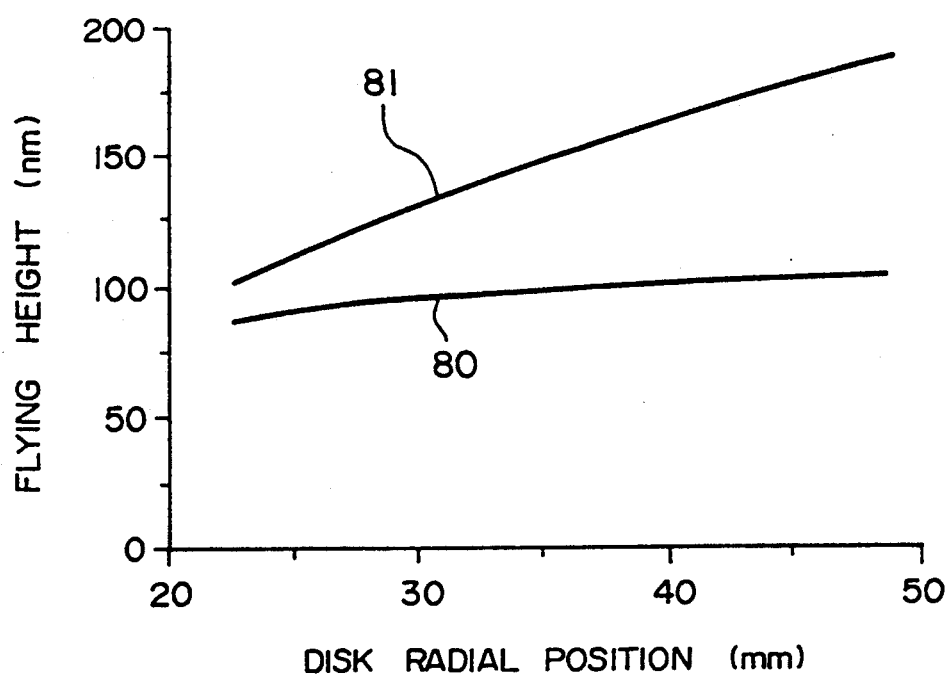
FIG. 32 is a graph showing a relationship between the disk radial position and the flying height when the sliders of the fourteenth embodiment and prior art are applied to magnetic disk apparatus of linear actuator type.
Figure 33:
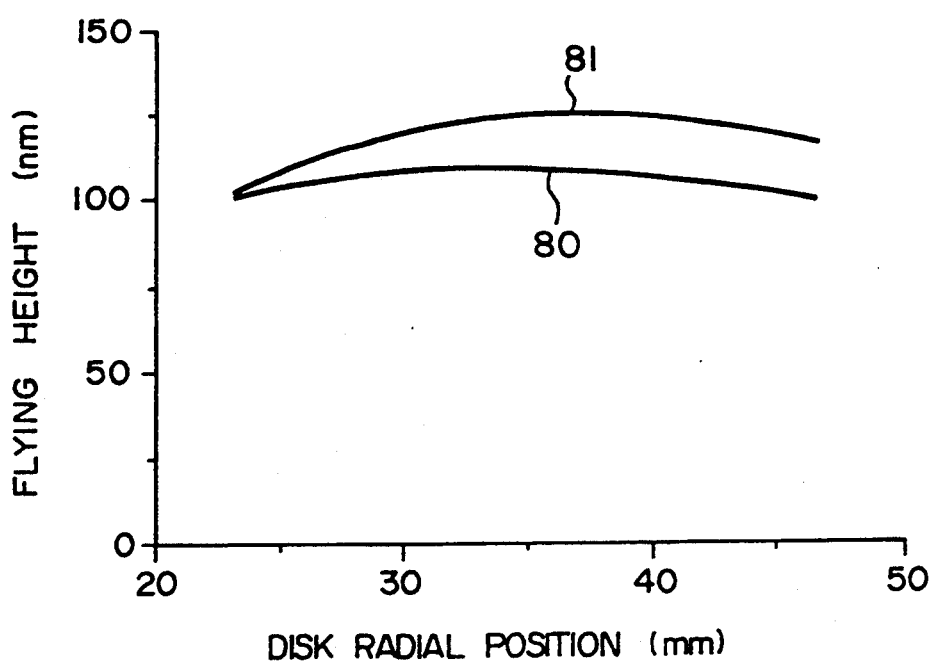
FIG. 33 is a graph showing a relationship between the disk radial position and the flying height when the sliders of the fourteenth embodiment and prior art are applied to magnetic disk apparatus of rotary actuator type.

FIG. 31 shows pressure distribution when the slider 12 of this fourteenth embodiment is flying. The inclined surface 14 and the cross rail 18 jointly form one pressure peak, while the two side rails 17 and the center rail 20 form respective pressure peaks near their rear ends. These pressure peaks are positioned separately at the front and rear sides and at the left and right sides of the slider, so that a sufficient degree of flying stability is achieved against pitching and rolling. Since the positive pressure is sufficiently generated by the cross rail 18, it is possible to ensure a satisfactory flying pitch angle and achieve the stably flying even if the inclined surface 14 is not formed throughout the slider width. Further, a sufficient degree of negative pressure is generated in two areas of the negative pressure pocket 19 defined by the positive pressure rails on the front sides and on the left and right sides thereof, whereby the flying height can be kept substantially uniform all over the disk. FIG. 32 shows one example of a relationship between the radial position of the disk and the flying height at an end surface of a magnetic head when the slider of this embodiment is mounted on a magnetic disk apparatus of linear actuator type. As will be seen, the flying height at the outer periphery is 1.5 times that at the inner periphery in the prior art slide (curve 81), while it is 1.1 or less times in the slider of this embodiment (curve 80). FIG. 33 shows one example of a relationship between the radial position of the disk and the flying height at the end surface of a magnetic head when the slider of this embodiment is mounted on a magnetic disk apparatus of rotary actuator type. In this case, the flying height at the outer periphery is 1.1 or less times that at the inner periphery in the slider of this embodiment (curve 80), as with the above case. Because reading output of a magnetic resistance effect head is independent of the relative speed between the head and the disk, almost the same recording density can be obtained at both the outer periphery and the inner periphery by mounting such a magnetic resistance effect head on the present slider. Also, by using the present slider in a magnetic disk apparatus which employs the multi-zone recording method, the recording density and memory capacity of the apparatus can be remarkably increased because almost the same recording density can be easily achieved at both the outer periphery and the inner periphery. Additionally, since the slider front edge is wedge-shaped toward the air inlet end, floating foreign matters coming from ahead of the slider and foreign matters deposited on the disk are deviated to the left and right ends of the slider from the standpoints of fluid dynamics and contact dynamics. As a result, the risk that those foreign matters may enter and deposit on the inclined surfaces 14, the cross rail 18 and the side rails 17, thereby deteriorating the floating characteristics, or they may be caught between the rails and the disk, thereby damaging the disk or making the recording information lost, is reduced to a large extent.

Figure 34:
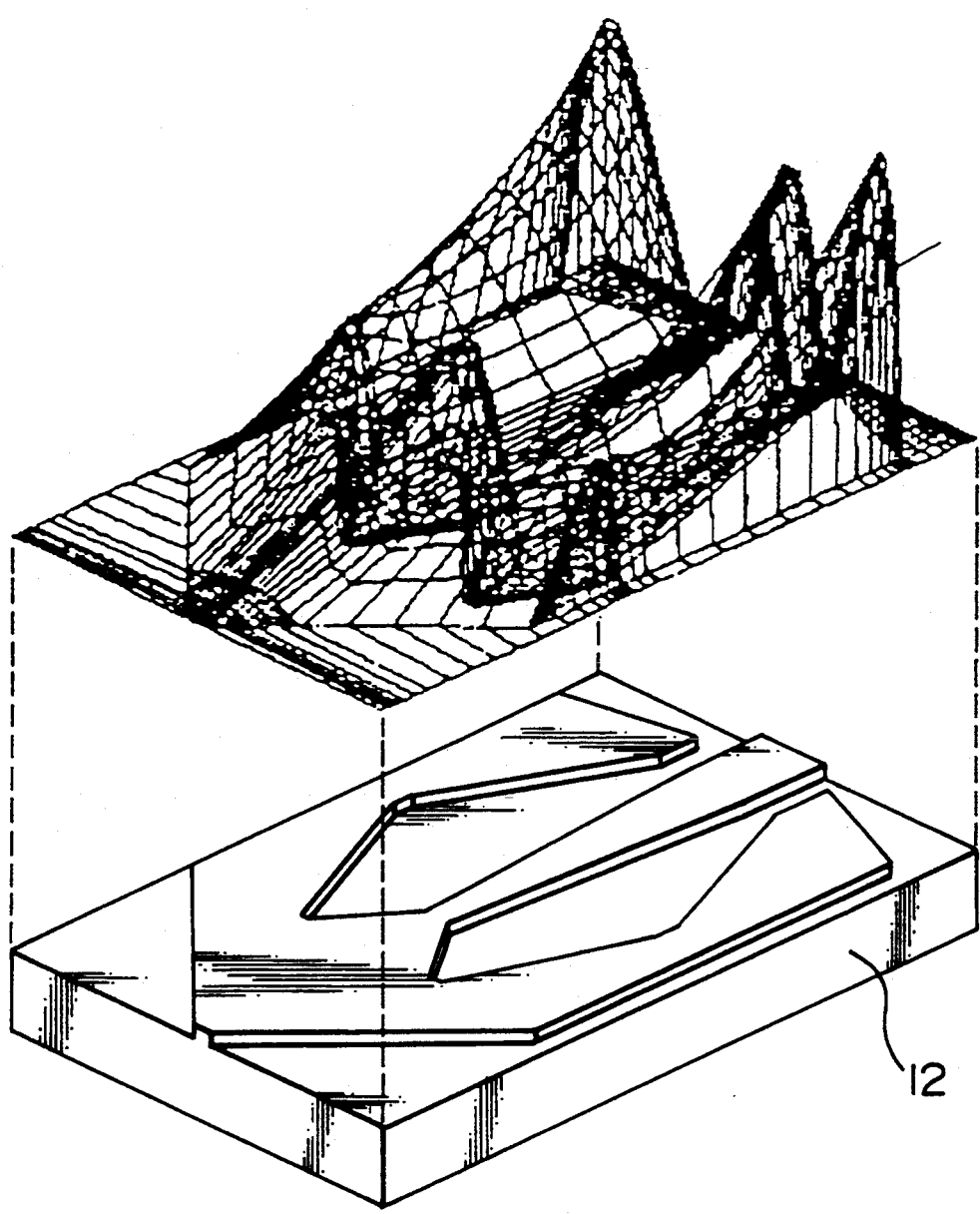
FIG. 34 is a perspective view showing an air bearing surface and pressure distribution in a fifteenth embodiment of the flying head slider utilizing a negative pressure according to the present invention.

FIG. 34 shows a perspective view of the slider 12 and pressure distribution during flying of the slider in a fifteenth embodiment of the present invention. The rail configuration of the slider of this embodiment is basically the same as that of the embodiment 14 except that the inclined surface 14 is not provided. If the inclined surface is omitted in the prior art slider, the pressure peaks would not be formed separately on the front and rear sides of the slider, with the result of remarkably degrading the flying stability in the pitching direction. In the slider of this embodiment configured as mentioned above, however, one pressure peak is clearly formed corresponding to the cross rail, as seen from the pressure distribution in FIG. 34, in spite of the absence of the inclined surface 14. Accordingly, the pressure peaks are formed separately on the front and rear sides of the slider, so that a sufficient degree of the flying stability is achieved in the pitching direction. The absence of the inclined surface is also advantageous in that intrusion and compression of foreign matters is greatly lessened and durability against foreign matters is improved.

Figure 35:
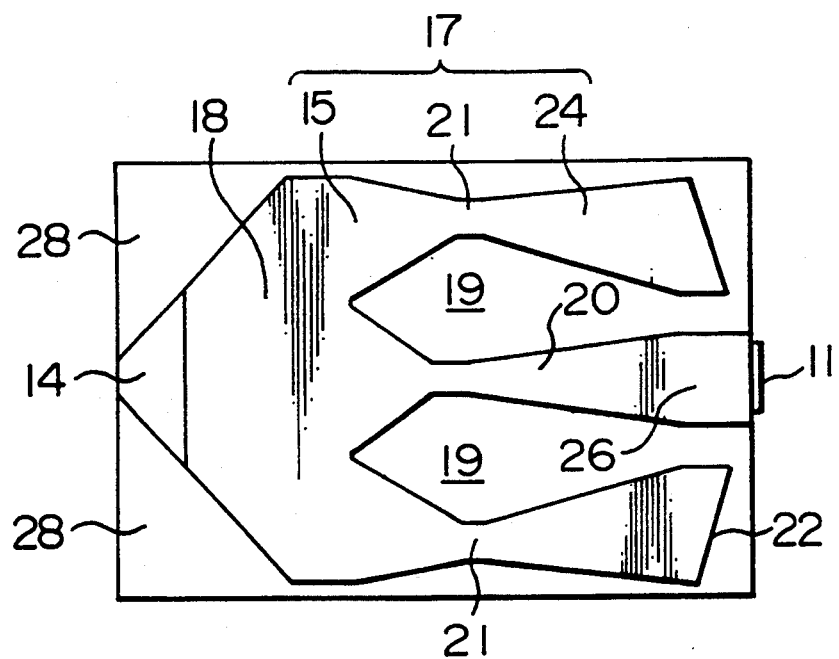
FIG. 35 is a bottom view of a sixteenth embodiment of the flying head slider utilizing a negative pressure according to the present invention.

FIG. 35 is a bottom view showing the air bearing surface of a sixteenth embodiment of the present invention. The slider of this embodiment has basically the same configuration as the fourteenth embodiment except that the side rails 17 are each narrowed in its intermediate portion from both left and right sides. With this configuration, the length along which air is to be compressed is less changed for each of the two side rails 17 under situation where a yaw angle is actually produced or is apparently produced during the access operation. It is thus possible to further suppress a reduction in the flying height and inclination of the slider in the rolling direction under such a situation.

Figure 36:
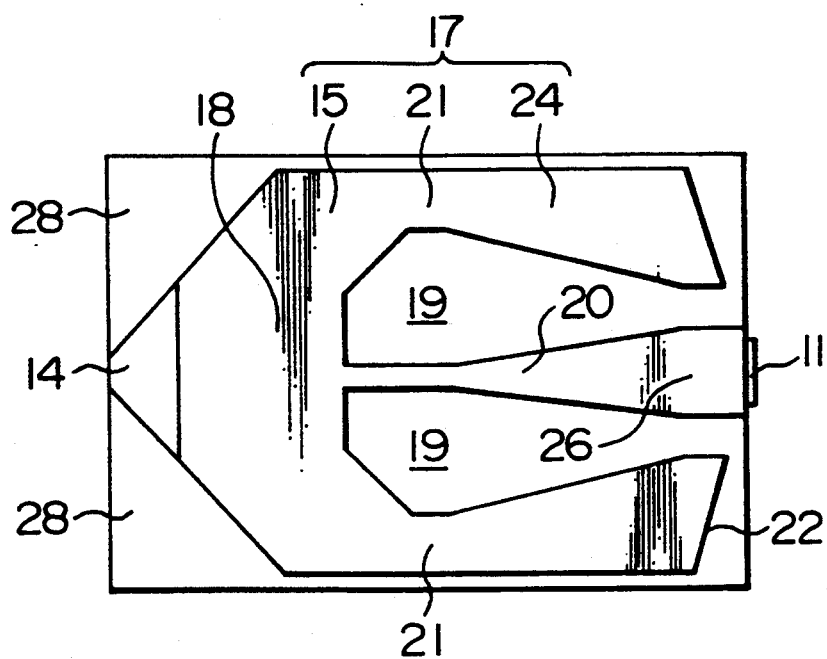
FIG. 36 is a bottom view of a seventeenth embodiment of the flying head slider utilizing a negative pressure according to the present invention.

FIG. 36 is a bottom view showing the air bearing surface of a seventeenth embodiment of the present invention. The slider of this embodiment has basically the same configuration as the fourteenth embodiment except that the angle formed between the cross rail 18 and the center rail 20 is substantially a right angle. With this configuration, the boundary line between the cross rail 18 and the negative pressure pocket 19 lies almost perpendicularly to the direction of air inflow, with an advantage of promoting generation of the negative pressure. Generally, when the size of the entire slider is reduced, the area of the negative pressure pocket 19 for generating the negative pressure also becomes smaller. The magnitude of the negative pressure generated is thereby reduced, making it difficult to keep small a difference in flying height between the inner and outer peripheries of the disk. This problem can be remarkably improved by adopting the slider configuration of this embodiment so as to effectively generate the negative pressure.

Figure 37:
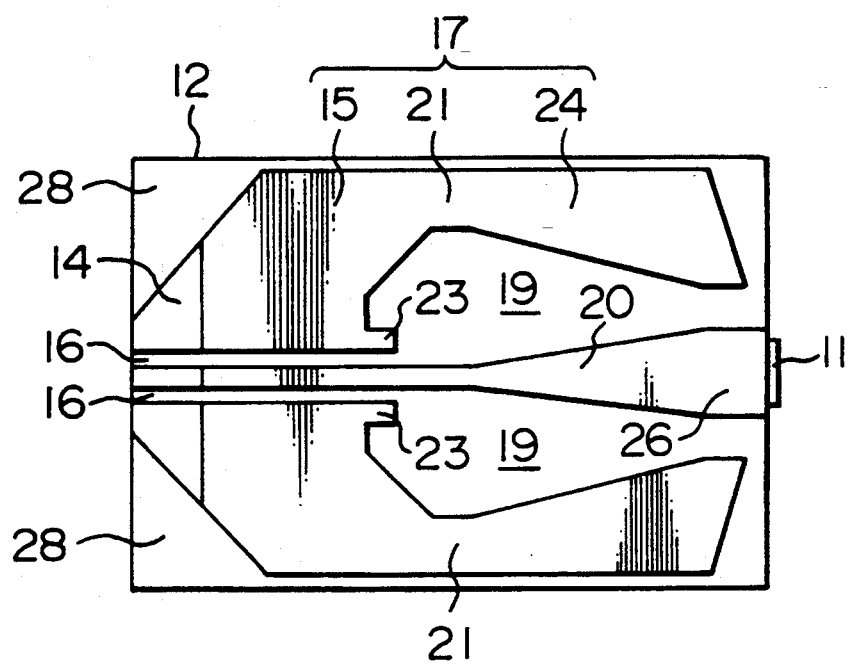
FIG. 37 is a bottom view of an eighteenth embodiment of the flying head slider utilizing a negative pressure according to the present invention.

FIG. 37 shows an eighteenth embodiment of the flying head slider according to the present invention. Any of the foregoing embodiments are suitable for small-sized sliders. Looking at those sliders in terms of size more strictly, the embodiments shown in FIGS. 1 to 24 are suitable for relatively large sliders in which the negative pressure pocket 19 generates a relatively large negative pressure, while the embodiments shown in FIGS. 30 to 36 are suitable for relatively small sliders in which the negative pressure pocket 19 generates a relatively small negative pressure. This eighteenth embodiment provides a configuration suitable for a slider of intermediate size. The basic configuration is the same as the seventeenth embodiment except that two grooves 16 are provided on both sides of the center rail 20 for communicating the negative pressure pocket 19 and the inlet end of the slider 12.

In addition to the advantages of the seventeenth embodiment, this embodiment can provide another advantage that the magnitude of negative pressure of the negative pressure pocket 19 can be adjusted by changing the width of each groove 16.

Figure 38:
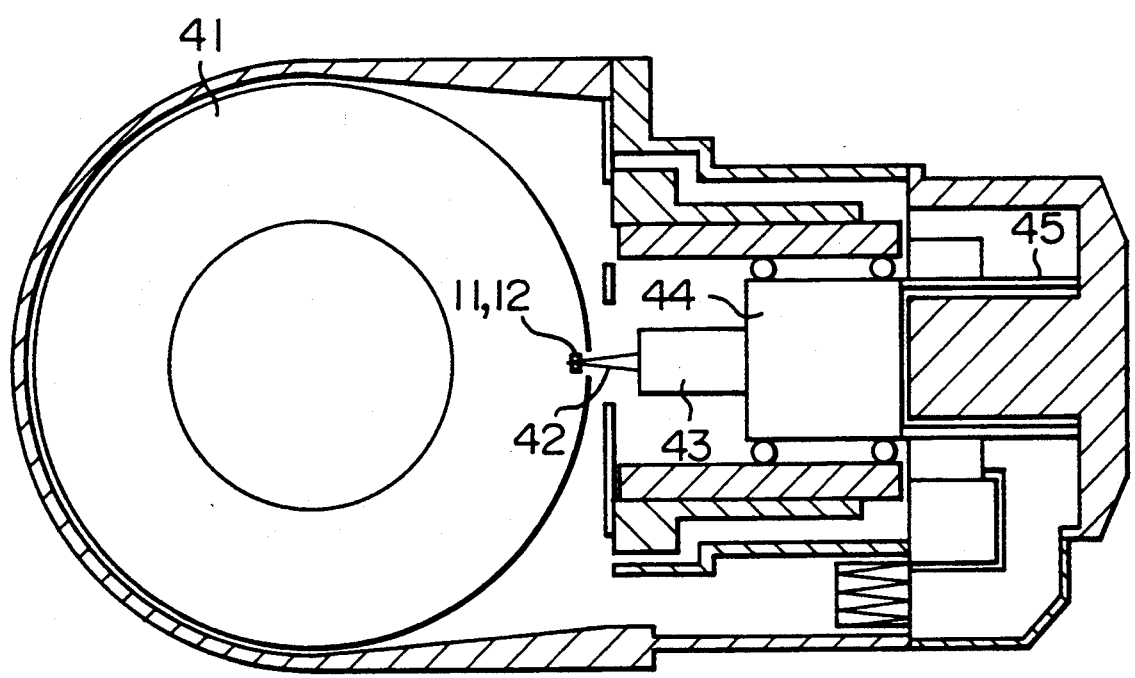
FIG. 38 is a sectional view of a magnetic disk apparatus of linear actuator type using a flying head slider according to the invention.

Referring to FIG. 38 showing a magnetic disk apparatus of linear actuator type, a guide arm 43 is connected to a carriage 44 and a transducer supporting device 42 is connected to the guide arm 43 and one of the flying head sliders 12 described hereinbefore and including a transducer 11 is mounted on a forward end of the transducer supporting device 42. The flying head slider 12 is linearly moved in a radial direction of a rotating magnetic disk 41 by a voice coil motor 45.

Figure 39:
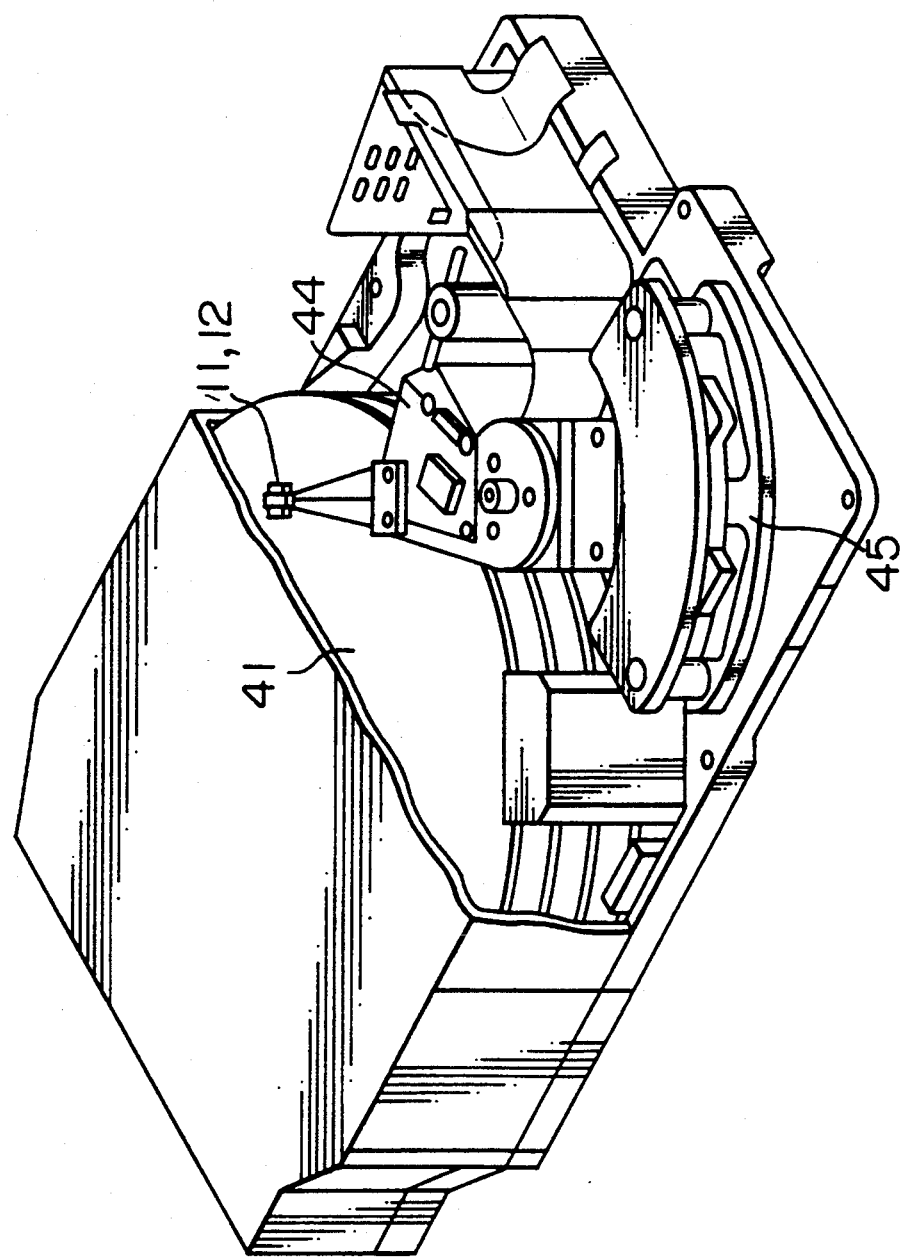
FIG. 39 is a perspective view of a magnetic disk apparatus of rotary actuator type using a flying head slider according to the invention.

Referring to FIG. 39 showing a magnetic disk apparatus of rotary actuator type, a transducer supporting device 42 is connected to a carriage 44 and one of the flying head sliders 12 described hereinbefore and including a transducer 11 is mounted on a forward end of the transducer supporting device 42. The flying head slider 12 is pivotally moved in a radial direction of a rotating magnetic disk 41 by a voice coil motor 45.

In the foregoing embodiments, it is explained that the narrow portion of the side rail is located at a position offset from the center of the slider nearer to the front end of the slider but the narrow portion may be located at the center of the slider or a position of the rear end side of the slider from the center of the slider although in such cases the performance of the slider is deteriorated. Further, the narrow portions of the side rails may be located at positions different from each other in the longitudinal direction of the slider when a small diameter disk is used.

In the foregoing embodiments, it is explained that the grooves 16 have the same depth as the negative pressure pocket 19 but the grooves may have a depth different from that of the negative pressure pocket so as to adjust the magnitude of the negative pressure generated in the negative pressure pocket.

What is claimed is:

1. A flying head slider utilizing a negative pressure which has a front end, a rear end, and an air bearing surface directed to face a rotating recording medium, said air bearing surface comprising,
   a pair of side rails extending on both sides of said air bearing surface from said front end in the longitudinal direction of said slider,
   a center rail provided at the center of said air bearing surface in the transverse direction and extending from said front end to said rear end in the longitudinal direction of said slider,
   a cross rail extending in the transverse direction of said slider to connect said pair of side rails and said center rail to each other near said front end,
   a pair of recesses defined by said pair of side rails, said center rail and said cross rail,
   communicating grooves for communicating said pair of recesses with said front end, and
   a head mounted on a rear end surface of said center rail; wherein
   said pair of side rails, said center rail and said cross rail lie substantially in the same plane;
   said pair of side rails are spaced from said rear end and are terminated at oblique edges in agreement with oblique lines extending from side edges of said slider to the center of said center rail at its rear end, said pair of side rails each having a width shape which is gradually narrowed from said front end toward a narrow portion located in a vicinity of a center of said slider, and is gradually spread from said narrow portion toward said rear end, and
   said center rail is extended from said cross rail with a substantially constant width, followed by a width shape gradually spreading toward said rear end.

2. A flying head slider according to claim 1, wherein said narrow portion of said side rail is located at a position between the front end side of said slider and the center of the slider.

3. A flying head slider according to claim 1, wherein the width shape of each of said pair of side rails is formed by changes of both side edges thereof.

4. A flying head slider according to claim 1, wherein the width shape of each of said pair of side rails is formed by changes of one side edge thereof which locates on the inner side of said slider.

5. A flying head slider according to claim 1, wherein said air bearing surface includes an inclined surface formed near said front end for gradually reducing the thickness of said slider toward said front end.

6. A flying head slider according to claim 5, wherein peninsula portions projecting from said cross rail into said recesses are provided near outlets of said communicating grooves to said recesses.

7. A flying head slider according to claim 5, wherein each of said communicating grooves has a width shape gradually narrowing toward an outlet of said communicating groove to said recesses.

8. A flying head slider according to claim 5, wherein cutouts are formed in said oblique edges at the rear ends of said side rails.

9. A flying head slider according to claim 1, wherein the width shape of said center rail gradually spreading toward said rear end starts from substantially the center of said slider in the longitudinal direction.

10. A flying head slider according to claim 1, wherein an air bearing area of said center rail as defined rearward from a loading point of said slider is smaller than the sum of air bearing areas of said pair of side rails as defined rearward from said loading point of said slider.

11. A flying head slider utilizing a negative pressure which has a front end, a rear end, and an air bearing surface directed to face a rotating recording medium, said air bearing surface comprising,
a pair of side rails extending on both sides of said air bearing surface from said front end in the longitudinal direction of said slider,
a center rail provided at the center of said air bearing surface in the transverse direction and extending from a position spaced from said front end to said rear end in the longitudinal direction of said slider,
a cross rail extending in the transverse direction of said slider to connect said pair of side rails to each other near said front end,
a recess defined by said pair of side rails and said cross rail,
a communicating groove for communicating said recess with said front end, and
a head mounted on a rear end surface of said center rail; wherein
said pair of side rails, said center rail and said cross rail lie substantially in the same plane;
said pair of side rails are spaced from said rear end and are terminated at oblique edges in agreement with oblique lines extending from side edges of said slider to the center of said center rail at its rear end, said pair of side rails each having a width shape which is gradually narrowed from said front end toward a narrow portion located in a vicinity of a center of said slider, and is gradually spread from said narrow portion toward said rear end, and
said center rail is extended with substantially a constant width, followed by a width shape gradually spreading toward said rear end.

12. A flying head slider according to claim 11, wherein said narrow portion of said side rail is located at a position between the front end side of said slider and the center of the slider.

13. A flying head slider utilizing a negative pressure which has a front end, a rear end, and an air bearing surface directed to face a rotating recording medium, said air bearing surface comprising,
a pair of side rails extending on both sides of said air bearing surface from said front end in the longitudinal direction of said slider,
a center rail provided at the center of said air bearing surface in the transverse direction and extending from a position spaced from said front end to said rear end in the longitudinal direction of said slider, said center rail having a width shape gradually spreading toward said rear end,
a cross rail extending in the transverse direction of said slider to connect said pair of side rails to each other near said front end,
a recess defined by said pair of side rails and said cross rail,
a plurality of communicating grooves for communicating said recess with said front end, and
a head mounted on a rear end surface of said center rail; wherein
said pair of side rails, said center rail and said cross rail lie substantially in the same plane; and
said pair of side rails are spaced from said rear end and each having a width shape which is gradually narrowed from said front end toward a narrow portion located in a vicinity of a center of said slider, and is gradually spread from said narrow portion toward said rear end.

14. A flying head slider according to claim 13, wherein said narrow portion of said side rail is located at a position between the front end side of said slider and the center of the slider.

15. A flying head slider utilizing a negative pressure which has a front end, a rear end, and an air bearing surface directed to face a rotating recording medium, said air bearing surface comprising,
a pair of side rails extending on both sides of said air bearing surface from said front end in the longitudinal direction of said slider,
a center rail provided at the center of said air bearing surface in the transverse direction and extending from said front end to said rear end in the longitudinal direction of said slider,
a cross rail extending in the transverse direction of said slider to connect said pair of side rails and said center rail to each other near said front end,
a pair of first recesses defined by said pair of side rails, said center rail and said cross rail, and
a head mounted on a rear end surface of said center rail; wherein
said pair of side rails, said center rail and said cross rail lie substantially in the same plane;
said pair of side rails are spaced from said rear end and are terminated at oblique edges in agreement with oblique lines extending from side edges of said slider to the center of said center rail at its rear end, said pair of side rails each having a width shape which is gradually narrowed from said front end toward a narrow portion located in a vicinity of a center of said slider, and is gradually spread from said narrow portion toward said rear end, and
said center rail is extended from said cross rail with substantially a constant width, followed by a width shape gradually spreading toward said rear end.

16. A flying head slider according to claim 15, wherein said narrow portion of said side rail is located at a position between the front end side of said slider and the center of the slider.

17. A flying head slider according to claim 15, wherein the width shape of each of said pair of side rails is formed by changes of both side edges thereof.

18. A flying head slider according to claim 15, wherein the width shape of each of said pair of side rails is formed by changes of one side edge thereof which locates on the inner side of said slider.

19. A flying head slider according to claim 15, wherein the width shape of said center rail gradually spreading toward said rear end starts from substantially a position located between the center and the rear of said slider in the longitudinal direction.

20. A flying head slider according to claim 15, wherein an air bearing area of said center rail as defined rearward from a loading point of said slider is smaller than the sum of air bearing areas of said pair of side rails as defined rearward from said loading point of said slider.

21. A flying head slider according to claim 15, wherein rectangular second recesses are formed at both corners of said front end of said slider.

22. A flying head slider according to claim 21, wherein said air bearing surface includes an inclined surface formed near said front end for gradually reducing the thickness of said slider toward said front end.

23. A flying head slider according to claim 15, wherein second recesses of a predetermined geometric shape are formed at both corners of said front end of said slider.

24. A flying head slider utilizing a negative pressure which has a front end, a rear end, and an air bearing surface directed to face a rotating recording medium,
said air bearing surface comprising,
a pair of side rails extending on both sides of said air bearing surface from said front end in the longitudinal direction of said slider,
a center rail provided at the center of said air bearing surface in the transverse direction and extending from said front end to said rear end in the longitudinal direction of said slider,
a cross rail extending in the transverse direction of said slider to connect said pair of side rails and said center rail to each other near said front end,
a pair of first recesses defined by said pair of side rails, said center rail and said cross rail,
triangular second recesses formed at both corners of said front end of said slider for forming side edges of said cross rail on the front end side into a wedge shape converging toward said front end, and
a head mounted on a rear end surface of said center rail; wherein
said pair of side rails, said center rail and said cross rail lie substantially in the same plane;
said pair of side rails are spaced from said rear end and are terminated at oblique edges in agreement with oblique lines extending from side edges of said slider to the center of said center rail at its rear end, said pair of side rails each having a width shape which is gradually narrowed from said front end toward a narrow portion located in a vicinity of a center of said slider, and is gradually spread from said narrow portion toward said rear end, and
said center rail is extended from said cross rail with substantially a constant width, followed by a width shape gradually spreading toward said rear end.

25. A flying head slider according to claim 24, wherein said narrow portion of said side rail is located at a position between the front end side of said slider and the center of the slider.

26. A flying head slider according to claim 24, wherein the width shape of each of said pair of side rails is formed by changes of both side edges thereof.

27. A flying head slider according to claim 24, wherein the width shape of each of said pair of side rails is formed by changes of one side edge thereof which locates on the inner side of said slider.

28. A flying head slider according to claim 24, wherein the width shape of said center rail gradually spreading toward said rear end starts from substantially the center of said slider in the longitudinal direction.

29. A flying head slider according to claim 24, wherein an air bearing area of said center rail as defined rearward from a loading point of said slider is smaller than the sum of air bearing areas of said pair of side rails as defined rearward from said loading point of said slider.

30. A flying head slider according to claim 24, wherein said air bearing surface includes an inclined surface formed near said front end for gradually reducing the thickness of said slider toward said front end.

31. A flying head slider according to claim 30, wherein a plurality of communicating grooves for communicating said first recesses with said front end are provided.

32. A magnetic disk apparatus of linear actuator type comprising;
a carriage;
a guide arm connected to said carriage;
a transducer supporting device connected to said guide arm;
a flying head slider as claimed in any of preceding claims 1 to 25 including a transducer, said flying head slider being mounted on a forward end of said transducer supporting device; and
a motor for linearly moving said flying head slider in a radial direction of a rotating magnetic disk.

33. A magnetic disk apparatus of rotary actuator type comprising:
a carriage;
a transducer supporting device connected to said carriage;
a flying head slider as claimed in any of preceding claims 1 to 25 including a transducer, said flying head slider being mounted on a forward end of said transducer supporting device; and
a motor for pivotally moving said flying head slider in a radial direction of a rotating magnetic disk.

* * * * *